(12) United States Patent
Courtin et al.

(10) Patent No.: US 12,298,151 B2
(45) Date of Patent: May 13, 2025

(54) SYSTEM AND METHOD FOR A PILOT GUIDANCE DISPLAY OF AN AIRCRAFT

(71) Applicant: Electra Aero, Inc., Manassas, VA (US)

(72) Inventors: Christopher B. Courtin, Fairfax Station, VA (US); Robert John Hansman, Jr., Cambridge, MA (US)

(73) Assignee: Electra Aero, Inc., Manassas, VA (US)

( * ) Notice: Subject to any disclaimer, the term of this patent is extended or adjusted under 35 U.S.C. 154(b) by 0 days.

(21) Appl. No.: 18/437,629

(22) Filed: Feb. 9, 2024

(65) Prior Publication Data
US 2024/0271963 A1 Aug. 15, 2024

Related U.S. Application Data

(60) Provisional application No. 63/444,795, filed on Feb. 10, 2023.

(51) Int. Cl.
| | | |
|---|---|---|
| *G01C 23/00* | (2006.01) | |
| *B64D 45/00* | (2006.01) | |
| *G06F 3/0488* | (2022.01) | |
| *G07C 5/08* | (2006.01) | |
| *G08G 5/00* | (2006.01) | |

(52) U.S. Cl.
CPC ........... *G01C 23/005* (2013.01); *B64D 45/00* (2013.01); *G06F 3/0488* (2013.01); *G07C 5/0808* (2013.01); *G07C 5/0825* (2013.01); *G08G 5/0021* (2013.01)

(58) Field of Classification Search
CPC ..... G01C 23/005; B64D 45/00; G06F 3/0488; G07C 5/0808; G07C 5/0825; G08G 5/0021
See application file for complete search history.

(56) References Cited

U.S. PATENT DOCUMENTS

| | | | | |
|---|---|---|---|---|
| 4,786,905 A * | 11/1988 | Muller | ................. | G01C 23/005 340/975 |
| 4,910,513 A * | 3/1990 | Kelly | ................... | G01C 23/005 340/975 |
| 6,629,023 B1 * | 9/2003 | Silder, Jr. | ............. | G05D 1/0676 340/948 |
| 7,095,338 B2 * | 8/2006 | Naimer | ..................... | G01S 7/24 340/961 |
| 8,195,346 B1 * | 6/2012 | Duerksen | ................ | B64C 13/16 701/15 |
| 8,624,757 B2 * | 1/2014 | Schrauben | ........... | G01C 23/005 340/945 |

(Continued)

*Primary Examiner* — Mussa A Shaawat
(74) *Attorney, Agent, or Firm* — DUANE MORRIS LLP

(57) ABSTRACT

In some embodiments, a pilot guidance display system may include a display operatively coupled to an aircraft and configured to provide a plurality of indications and a plurality of limits to a pilot. The pilot guidance display may also include a computing device operatively coupled to the aircraft and communicatively coupled to the display. The computing device may have at least one processor configured to update the plurality of indications and the plurality of limits on the display in real-time based at least in part on a plurality of conditions provided by a plurality of sensors on the aircraft. The plurality of limits may include a first maximum angle of attack indicator. Methods and computer implemented operations are also disclosed.

20 Claims, 12 Drawing Sheets

(56) References Cited

U.S. PATENT DOCUMENTS

| | | | | |
|---|---|---|---|---|
| 8,626,364 B2* | 1/2014 | Moresve | | G05D 1/0684 |
| | | | | 701/16 |
| 8,886,373 B2* | 11/2014 | Garrec | | G01S 13/82 |
| | | | | 701/17 |
| 9,205,931 B1* | 12/2015 | Kawalkar | | G01C 23/005 |
| 9,221,552 B2* | 12/2015 | Conner | | G01C 23/005 |
| 9,310,222 B1* | 4/2016 | Suiter | | G08G 5/0091 |
| 9,938,018 B2* | 4/2018 | Welsh | | G05D 1/0061 |
| 11,465,734 B1* | 10/2022 | Wiegman | | B64C 13/16 |
| 11,592,791 B1* | 2/2023 | Wiegman | | B64D 27/24 |
| 11,787,526 B2 | 10/2023 | Courtin et al. | | |
| 11,846,953 B2 | 12/2023 | Hansman, Jr. et al. | | |
| 2007/0181750 A1* | 8/2007 | Astruc | | G08G 5/0034 |
| | | | | 244/220 |
| 2010/0168939 A1* | 7/2010 | Doeppner | | G05D 1/0676 |
| | | | | 701/16 |
| 2011/0307126 A1* | 12/2011 | Hogstrom | | G05D 1/0684 |
| | | | | 701/16 |
| 2012/0130566 A1* | 5/2012 | Anderson | | G05D 1/0858 |
| | | | | 701/16 |
| 2013/0345910 A1* | 12/2013 | Kerho | | B64D 43/02 |
| | | | | 701/14 |
| 2014/0156116 A1* | 6/2014 | Nelson | | G01C 23/00 |
| | | | | 701/14 |
| 2016/0347469 A1* | 12/2016 | Welsh | | G05D 1/0816 |
| 2016/0356626 A1* | 12/2016 | Caillaud | | G08G 5/025 |
| 2018/0017410 A1* | 1/2018 | Ludtke, II | | B64D 43/02 |
| 2018/0134410 A1* | 5/2018 | Fymat | | B64D 43/00 |
| 2020/0090523 A1* | 3/2020 | Arnoux | | G08G 5/003 |
| 2022/0315205 A1* | 10/2022 | Moy | | B64C 29/0025 |
| 2022/0343778 A1* | 10/2022 | Yankanchi | | G08G 5/0021 |
| 2022/0358696 A1* | 11/2022 | Holder | | G08G 5/025 |
| 2023/0084918 A1* | 3/2023 | Wiegman | | B64D 45/00 |
| | | | | 701/3 |
| 2023/0152823 A1* | 5/2023 | Wiegman | | G08G 5/0021 |
| | | | | 701/3 |
| 2023/0205229 A1 | 6/2023 | Masefield et al. | | |

* cited by examiner

SYSTEM AND METHOD FOR A PILOT GUIDANCE DISPLAY OF AN AIRCRAFT

CROSS-REFERENCE TO RELATED APPLICATIONS

This application claims the benefit of priority under 35 U.S.C. § 119(e) to prior U.S. Provisional Application No. 63/444,795 filed on Feb. 10, 2023, the disclosure of which is incorporated by reference herein in its entirety.

FIELD OF DISCLOSURE

The present disclosure generally relates to the field of aviation. More specifically, the present disclosure generally relates to a pilot guidance display to show aircraft states, limitations, and atmospheric conditions to aid the pilot during flight.

BACKGROUND

In conventional aircraft, the lift coefficient of the aircraft in a landing configuration depends only on angle of attack (AOA), and the maximum (stall) AOA typically has only small variations of power. Meaning if the aircraft weight is known, the pilot can define a single speed corresponding to flight at the stall AOA, or the stall speed. With this information a pilot of a conventional aircraft can use an airspeed indicator to maintain a safe margin from stall during the applicable mode of operation (e.g., takeoff/climb, cruise, descent/approach, etc.) Due to the simplicity of only relying on one indication to maintain a safe margin from stall, conventional displays (e.g., head-up display (HUD), head-down display (HDD), angle of attack indicator display, and/or primary flight display (PFD)) can be used as an aid to the pilot during the various modes of operation.

Electric short takeoff and landing (eSTOL) aircraft that rely on blown lift technology with a distributed electric propulsion (DEP) system and electric propulsion units (EPUs) operatively coupled to the aircraft's wings bring with it a variety of differences over conventional aircraft. In a blown lift aircraft, the EPUs are used to blow over and under the wings augmenting the lift of the wings. Due to the nature and complexity of eSTOL aircraft operating conditions, such as short runways, it is critical for the pilot to accurately land in the touchdown aim point or make the necessary decision to go-around and try the landing sequence again. Additionally, blown lift aircraft have ever changing operating limits due to a variety of factors such as the aircraft configuration and airspeed, as well as atmospheric conditions. Specifically, variable limits, such as the aircraft maximum AOA, flight path limit, and/or minimum speed, will vary based on changing aircraft and atmospheric conditions. These changing limits must be evaluated by the pilot and accounted for during the different modes of operation.

In a blown lift aircraft, the lift coefficient depends on AOA, airspeed, and power setting, making the problem more complex because the pilot can no longer rely on airspeed alone to maintain a safe margin from the stall angle, as is conventional. Therefore, conventional displays are not as accurate or useful to the pilot in a blown lift aircraft. Additionally, the stall angle of a blown lift aircraft will also vary significantly more than conventional aircraft due to changes in power setting, flap configuration, and airspeed. Furthermore, blown lift aircraft require increasing thrust at reduced speeds, reducing the steepness of a potential approach for landing. The steepest target flight path angle, or flight path limit, the aircraft can achieve will depend on the target approach speed of the aircraft. For these reasons, a pilot will need a pilot guidance display system to provide real-time updates on the current state of the aircraft and give visual and/or audible indication of the aircraft flight parameter limits and targets, as well as the margin to those flight parameter limits.

SUMMARY

In some embodiments, a pilot guidance display system may include a display operatively coupled to an aircraft and configured to provide a plurality of indications and a plurality of limits to a pilot. The pilot guidance display may also include a computing device operatively coupled to the aircraft and communicatively coupled to the display. The computing device may have at least one processor configured to update the plurality of indications and the plurality of limits on the display in real-time based at least in part on a plurality of conditions provided by a plurality of sensors on the aircraft. The plurality of limits may include a first maximum angle of attack indicator.

In some embodiments, a method may include receiving, at a computing device, a plurality of conditions from a plurality of sensors on an aircraft. The method may also include evaluating the plurality of conditions from the plurality of sensors. The method may also include providing a plurality of indications and a plurality of limits on a display communicatively coupled to the computing device based at least in part on the changes in the plurality of conditions. The plurality of limits may include a first maximum angle of attack indicator.

In some embodiments, a non-transitory computer readable medium having instructions stored thereon, wherein the instructions, when executed by at least one processor may cause a computing device to perform operations including receiving a plurality of conditions from a plurality of sensors on an aircraft. The operations may also include evaluating the plurality of conditions from the plurality of sensors. The operations may also include providing a plurality of indications and a plurality of limits on a display communicatively coupled to the computing device based at least in part on the changes in the plurality of conditions. The plurality of limits may include a first maximum angle of attack indicator.

With the use of the pilot guidance display system, the pilot of a blown lift aircraft will be able to safely achieve short takeoffs and high precision landings. As will be disclosed herein, the pilot guidance display will be able to accurately show the limitations and targets of the aircraft as well a variety of other flight indications based on static and/or changing variables to ensure the pilot stays within the aircraft capabilities during different aircraft modes of operation.

BRIEF DESCRIPTION OF THE DRAWINGS

The features and advantages of the present disclosure will be more fully disclosed in, or rendered obvious by, the following detailed descriptions of example embodiments. The detailed descriptions of the example embodiments are to be considered together with the accompanying drawings wherein like numbers refer to like parts and further wherein.

Figure 1:
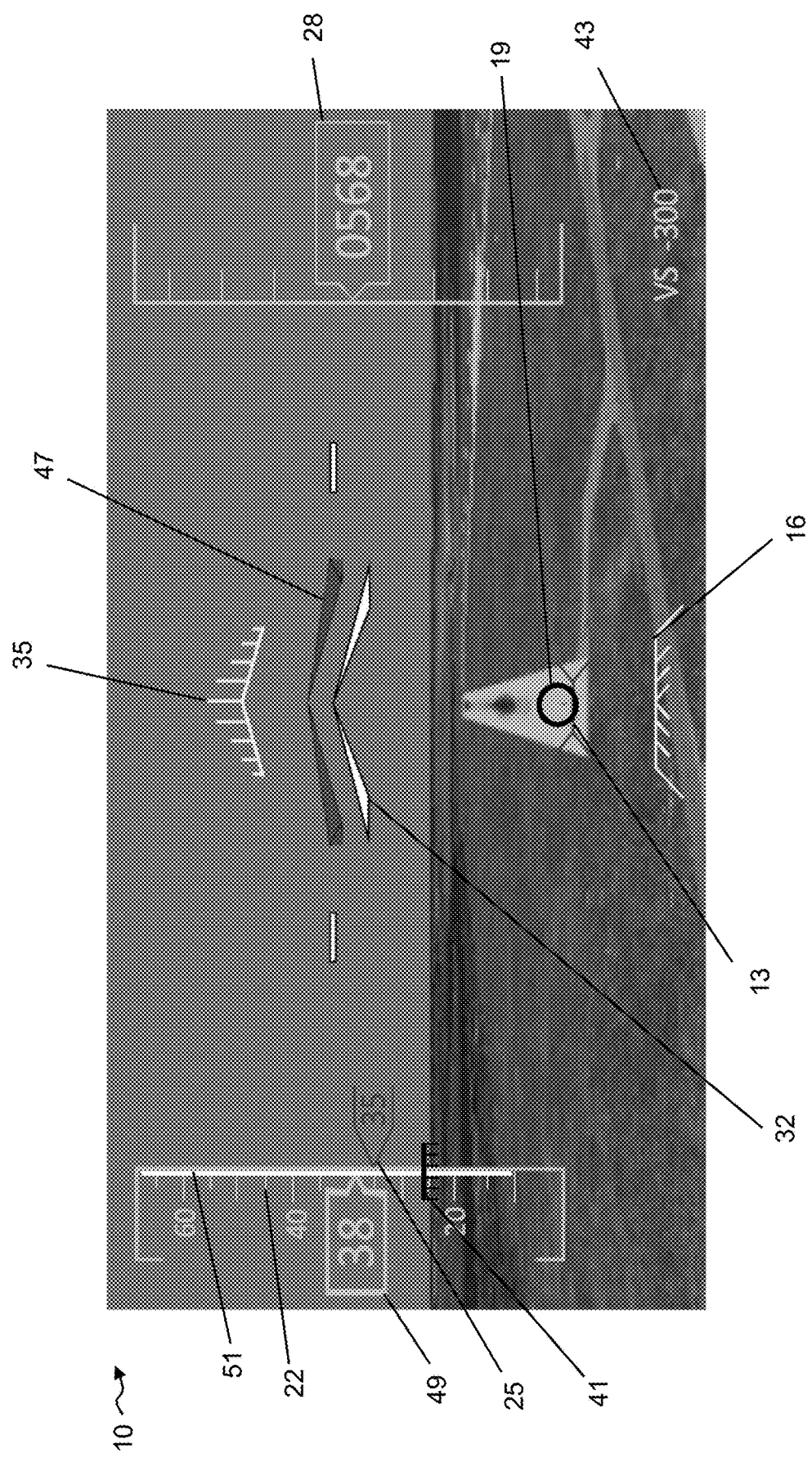
FIG. 1 illustrates an exemplary view of a pilot guidance display in accordance with some embodiments.

While the present disclosure is susceptible to various modifications and alternative forms, specific embodiments have been shown by way of example in the drawings and will be described in detail herein. It should be understood that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

This description of the exemplary embodiments is intended to be read in connection with the accompanying drawings, which are to be considered part of the entire written description. It should be understood, however, that the present disclosure is not intended to be limited to the particular forms disclosed and that the drawings are not necessarily shown to scale. Rather, the present disclosure covers all modifications, equivalents, and alternatives that fall within the spirit and scope of these exemplary embodiments. In the description, relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected" refer to a relationship wherein structures are secured or attached to one another either directly or indirectly through intervening structures, as well as both movable or rigid attachments or relationships, unless expressly described otherwise. The terms "couple," "coupled," "operatively coupled," "operatively connected," and the like should be broadly understood to refer to connecting devices or components together either mechanically, or otherwise, such that the connection allows the pertinent devices or components to operate with each other as intended by virtue of that relationship.

The present disclosure addresses the aforementioned challenges and problems for a blown lift aircraft. The present disclosure is directed to systems and methods for a pilot guidance display (PGD) system that may provide visual and/or audible indications of aircraft limitations and targets, as well as the margins to those limitations based on a variety of changing aircraft parameters. Embodiments of the present disclosure advantageously display real-time updates to the aircraft indications, limitations and targets, and the margins to those limitations on an improved pilot guidance display based on a plurality of static and/or changing variables.

According to various embodiments, a pilot guidance display is used in an aircraft with electric propulsion having short takeoff and landing (eSTOL) capabilities and therefore operating at low airspeeds. For example, the pilot guidance display may be operatively coupled to a blown lift aircraft having a distributed electric propulsion (DEP) system with electric propulsion units (EPUs) powering propellers operatively coupled to the leading edge of the wings according to some embodiments. An example of a blown lift aircraft is disclosed in U.S. Pat. No. 11,787,526, which issued on Dec. 17, 2023 and is titled "SYSTEM AND METHOD FOR LIFT AUGMENTATION OF AIRCRAFT WINGS", the entirety of which is incorporated herein by reference.

In some embodiments, the pilot guidance displays disclosed herein could be used on aircraft with vertical takeoff and landing (VTOL) capabilities or other type of aircraft, such as any conventional fixed or rotary wing aircraft. A pilot guidance display may be an improved HUD, HDD, angle of attack (AOA) indicator display, and/or PFD, and may provide a plurality of indications (e.g., flight parameters, limitations, margins to those limitations, etc.) for the pilot to rely on in order to simplify the pilot's responsibilities during the different modes of operation. The limitations may be set based on flight testing and authority approval, such as Federal Aviation Administration (FAA) approval according to some embodiments.

Referring now to the figures, FIG. 1 illustrates an exemplary view of a pilot guidance display 10 in accordance with some embodiments. The pilot guidance display 10 may include various flight indications, targets, and limitations. For example, the pilot guidance display 10 may include a target flight path indicator 13, a flight path limit 16, a flight path vector 19, an airspeed tape 22, a speed bug 25, an altitude indicator 28, an attitude indicator 32, a maximum AOA indicator 35, minimum airspeed indicator 41, a vertical speed indicator 43 and/or a pitch target 47, just to give a few examples. Although multiple flight indications are listed, it will be appreciated by a person of ordinary skill in the art that other flight indications may also be displayed and the aforementioned list is not exhaustive of all possible flight indications, targets, and limits. In some embodiments, the pilot guidance display 10 may be configured to show or alert the pilot of various problems or failure scenarios.

The target flight path indicator 13 may be set by the pilot or some flight control system as will be described in more detail below. In some embodiments, the chevrons on either side of the target flight path indicator 13 may indicate ±2 degrees (i.e., 1 degree above and 1 degree below the target flight path indicator.

The flight path limit 16 may be set the pilot or some flight control system as will be described in more detail below. In some embodiments, the flight path limit of the aircraft may be set based on an applicable regulation and/or aircraft configuration.

The flight path vector 19 may indicate the current flight path intercept point. Meaning, if the aircraft were to continue flying on its current trajectory, the aircraft would contact the point where the flight path vector 19 intercepts the landmark on the pilot guidance display 10. Although the pilot guidance display 10 illustrates the flight path vector 19 as an open circle, it will be appreciated that the flight path vector may be any other suitable shape or structure, such as a closed circle, square, triangle, etc.

The airspeed tape 22 may illustrate a plurality of discrete speeds, such as the tick marks illustrated in FIG. 1. The airspeed tape 22 may also include the aircraft's current airspeed indicator 49 overlaid on the airspeed tape 22. This current airspeed indicator 49 may be configured to continuously update on the airspeed tape 22 as the aircraft's speed changes. Also overlaid on the airspeed tape 22 may be a speed bug 25, which may be the target speed of the aircraft. In some embodiments, this speed bug 25 may be used to set the pitch target 47. The airspeed tape 22 may also include the minimum speed indicator 41. The minimum speed indicator 41 may be set by the pilot or dynamically by a flight control system based on the blowing level (e.g., thrust-producing device power level) and/or flap setting. In some embodiments, the airspeed tape 22 may include an allowable flap speed indicator 51. This allowable flap speed indicator 51 may show a pilot the allowable speed range the aircraft can maintain with the current flap setting (e.g., deployed, not deployed, angle of the flap, etc.). In some embodiments, the pilot guidance display 10 may also include a vertical speed indicator 43, which may indicate the aircraft's current climb or descent rate. In some embodiments, the vertical speed indicator 43 may be illustrated as vertical speed bar instead of the digital read out illustrated in FIG. 1.

The pilot guidance display 10 may also include an altitude indicator 28. The altitude indicator 28 may use a barometric altimeter, radar altimeter, global positioning system (GPS), etc. or a combination thereof to provide the altitude of the aircraft. The pilot guidance display 10 may also include an attitude indicator 32, which may illustrate the aircraft's current pitch, roll, and/or yaw state.

The pilot guidance display 10 may also include a maximum AOA indicator 35. The maximum AOA indicator 35 may be set by the pilot or may be set dynamically by a flight control system as will be discussed in more detail below. For example, the maximum AOA indicator 35 may be based on the aircraft's airspeed, flaps, blowing level (e.g., thrust-producing device power), bank angle, and/or gravity. In some embodiments, the maximum AOA indicator 35 may vary dynamically to reflect low-speed bank angle limits. In some embodiments, the vertical bars on the top of the maximum AOA indicator 35 may illustrate an angle from the limit. For example, the smallest vertical bar on each end of the maximum AOA indicator 35 may indicate the aircraft is 1 degree over the limit, the second smallest vertical bar may indicate that the aircraft is 2 degrees over the limit, and so on.

The pilot guidance display 10 may also include a pitch target 47. In some embodiments, the pitch target 47 may be set by the pilot or may be dynamically set by a flight control system. For example, the pitch target indicator 47 may be set dynamically based on the aircraft's airspeed target, the blowing level (e.g., thrust-producing device power level), and/or the flap setting.

In some embodiments, the pilot guidance display 10 may be configured to show or alert the pilot of various problems or failure scenarios. A person of ordinary skill in the art would appreciate and understand other necessary or useful indications and/or display layouts that may be substituted for, removed, or added to in the disclosed pilot guidance display 10. The indications (e.g., colors, symbols, type, shape, etc.) and layout are merely a few examples. For example, the color of an indication could change or a symbol could be removed from the pilot guidance display 10 in the absence of an input (i.e., signal) from one of the static or changing variables used to calculate the indication. A person of ordinary skill in the art would appreciate and understand other necessary or useful indications and/or display layouts that may be substituted for, removed, or added to in the disclosed pilot guidance display 10.

Figure 2:
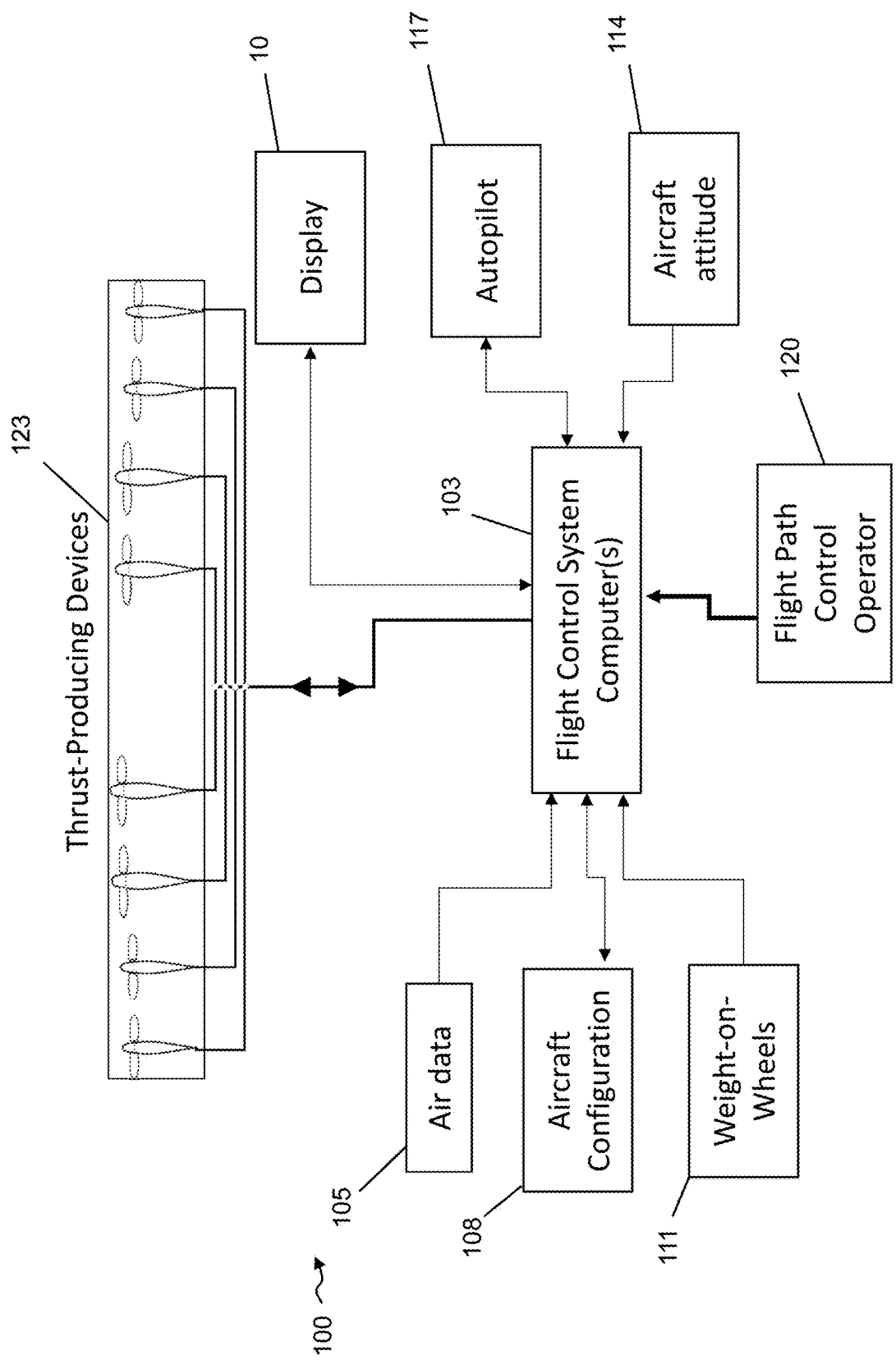
FIG. 2 illustrates a block diagram of a first example of a pilot guidance display system in accordance with some embodiments.

FIG. 2 illustrates a block diagram of a first example of a pilot guidance display system 100 in accordance with some embodiments. The pilot guidance display system 100 may include one or more flight control system (FCS) computers 103 configured to evaluate a plurality of conditions from a plurality of sensors around the aircraft and display a plurality of indications and limits on a pilot guidance display 10. The plurality of conditions includes various aircraft and flight parameters used to calculate the limits, targets, and/or indications of the pilot guidance display 10, and the margins to those limits. The plurality of conditions may include data from an air data module 105, an aircraft configuration module 108, a weight-on-wheels module 111 of the aircraft, an aircraft attitude module 114, the settings from an autopilot (A/P) module 117, and a flight path control operator 120. In some embodiments, the pilot guidance display system 100 may also include an input from the thrust-producing devices 123 (e.g., EPUs) of the aircraft. A person of ordinary skill in the art will appreciate that a variety of additional inputs may be provided to the FCS computer 103 to in order to display the desired indications, targets, and limits on the pilot guidance display 10.

In other embodiments, the pilot guidance display system 100 may work in combination with or be replaced by a flight path control system comprising a power management computer (PMC) as disclosed in U.S. Patent Application Publication No. 2023/0205229, which was filed on Dec. 20, 2022, and is titled "SYSTEM AND METHOD FOR CONTROLLING FLIGHT PATH OF A BLOWN LIFT AIRCRAFT", the entirety of which is incorporated herein by reference.

In various embodiments, an air data module 105 is configured to be processed by the FCS computer 103 from a plurality of on-board sensors such as pitot and static probes, angle of attack and sideslip probes, total or static air temperature probes, radar altimeter, normal acceleration and global positioning system (GPS) data based on altitude, position, and atmospheric conditions. In various embodiments, additional data may be obtained from satellite or terrestrial transmitters. A person of ordinary skill in the art will appreciate that various sensors may be used and the above-mentioned list is not exhaustive or limiting. The sensors will provide information about the aircraft's airspeed, altitude (density and physical), and velocity vector (e.g., airspeed and/or vertical velocity). In various embodiments, the air data module 105 is operatively coupled to the aircraft configuration module 108 and, together with an input on the current aircraft weight, calculate the airspeed margin above the stall speed based on the aircraft configuration (i.e., flap deflection, aileron/flaperon deflection, etc.), which can be used to provide optimum targets for the desired mode of operation. In some embodiments, the aforementioned data is communicated to the pilot guidance display 10. For example, the output can be graphically displayed on a user interface via the pilot guidance display 10 to show various flight parameters (e.g., current speed indicator 49, altitude indicator 28, attitude indicator 32, flight path vector 19, etc.) associated with the on-board sensors as well the computed target flight path angle indicator 13.

According to some embodiments, aircraft configuration data such as flap deflection, aileron droop angles, slat extension, trim settings, landing gear extension, aircraft weight, and center of gravity will be processed by the aircraft configuration module 108 and be received via the FCS computer 103 to be used in the overall calculation of the indications, targets, and limits of the pilot guidance display 10. In various embodiments, the flap, slat, and/or landing gear extension will determine the lift, drag, and pitching moment information of the aircraft from reference algorithms, lookup tables, and/or machine learned models. The lift information can be used to calculate the margin to the minimum safe flight speed as a function of the thrust-producing device power level. The FCS computer 103 may be configured to use the actual status information of the aircraft configuration (i.e., flap deflection, aileron/flaperon deflection, etc.) to calculate the limits, targets, and indications of the pilot guidance display 10 according to a calculation method such as lookup tables, referencing an algorithm, and/or utilizing a machine learned model to calculate the flight parameter indications, targets, and limits, as well as margins to those limits.

According to various embodiments, the weight-on-wheels module 111 may be used to indicate, by a weight-on wheels signal, if the aircraft is firmly on the ground (or in the air) using a "squat switch", wheel speed sensors, or other device that can determine the aircraft ground status. In other embodiments, there may be a plurality of switches or sensors for redundancy. The weight-on-wheels module 111 may be verified with plausibility checks using a radar altimeter or airspeed data. The weight-on-wheels module 111 may be used by the FCS computer 103 and other input modules to determine the thrust-producing device power levels for takeoff, landing, braking, and taxiing.

In some embodiments, the pilot guidance display system 100 also includes an input from a flight path control operator 120 in order to provide the FCS computer 103 with the desired mode of operation. The indications, targets, and limits of the pilot guidance display 10 may change based on the selected mode of operation of the flight path control operator 120. In some embodiments, the flight path control operator 120 has at least five predefined selectable positions corresponding to takeoff/climb, cruise/taxi, descent/approach, off, reverse. To give an example, the FCS computer 103 may use a different algorithm, lookup table, or model to calculate some of the indications, targets, and limits of the pilot guidance display 10 based on position of the flight path control operator 120. For example, the target AOA indicator (described in more detail below) or target flight path angle indicator 13 may have a different value for a takeoff/climb vs. a descent/approach mode of operation.

In some embodiments, the pilot guidance display system 100 also includes an aircraft attitude module 114 in order to provide the FCS computer 103 with the attitude (e.g., roll, pitch, yaw) of the aircraft, which also may include the bank angle. The attitude of the aircraft may be provided from a plurality of sensors such as an attitude heading reference system (AHRS), a gyro, an inertial navigation system, and/or other similar systems. The aircraft attitude module 114 may work in conjunction with various data from the air data module 105 and/or the aircraft configuration module 108, and processed by the FCS computer 103 in order to ensure the aircraft is maintained within acceptable values of pitch angles. For example, the air data module 105 may provide the airspeed of an aircraft and the aircraft configuration module 108 provides the position of an elevator, the FCS computer 103 would process the data and could adjust the power level of the thrust-producing devices 123 as needed to maintain an acceptable pitch angle.

In various embodiments, the autopilot module 117 is configured to provide information to the FCS computer 103 of activation or status (i.e., if autopilot is on or off), commanded mode of operation of the autopilot module 117, speed of the aircraft, aircraft configuration, and the power setting or power condition of the thrust-producing devices 123. In other embodiments, the autopilot module 117 may utilize one or more algorithms, lookup tables, and/or machine learned model within a fly-by-wire system. Yet in other embodiments, the autopilot module 117 may be configured to receive input from the FCS computer 103 and optimize the commanded mode of operation as well as assist in holding airspeed, maintaining or adjusting angle of attack, and maintaining or changing flight altitude.

In various embodiments, the pilot guidance display 10 is adapted to receive input from a variety of the modules identified in FIG. 2 through the FCS computer 103 and is capable of displaying flight and systems information, indications, targets and limits on the pilot guidance display 10. The pilot guidance display 10, through a user interface, may be configured to provide information in real-time, such as the plurality of conditions from the input data illustrated in FIG. 2. The pilot guidance display 10 may be configured to provide flight indications, such as the target flight path indicator 13, the flight path limit 16, the flight path vector 19, the airspeed tape 22 (including the current airspeed indicator 49 and the allowable flap speed indicator 51), the speed bug 25, the altitude indicator 28, the attitude indicator 32, the maximum AOA indicator 35, the minimum airspeed indicator 41, the vertical speed indicator 43 and/or a pitch target 47, just to give a few examples. Although multiple flight indications are listed, it would be apparent to a person of ordinary skill in the art that other flight indications, targets, limits, etc. may also be displayed and the aforementioned list is not exhaustive. In some embodiments, the pilot guidance display 10 may be configured to show or alert the pilot of various problems or failure scenarios.

In some embodiments, the thrust-producing devices 123 may provide a power setting or power condition input to the FCS computer(s) 103 in order for the FCS computer(s) 103 to process, calculate, and display the plurality of indications, targets, and limits on the pilot guidance display 10.

Figure 3:
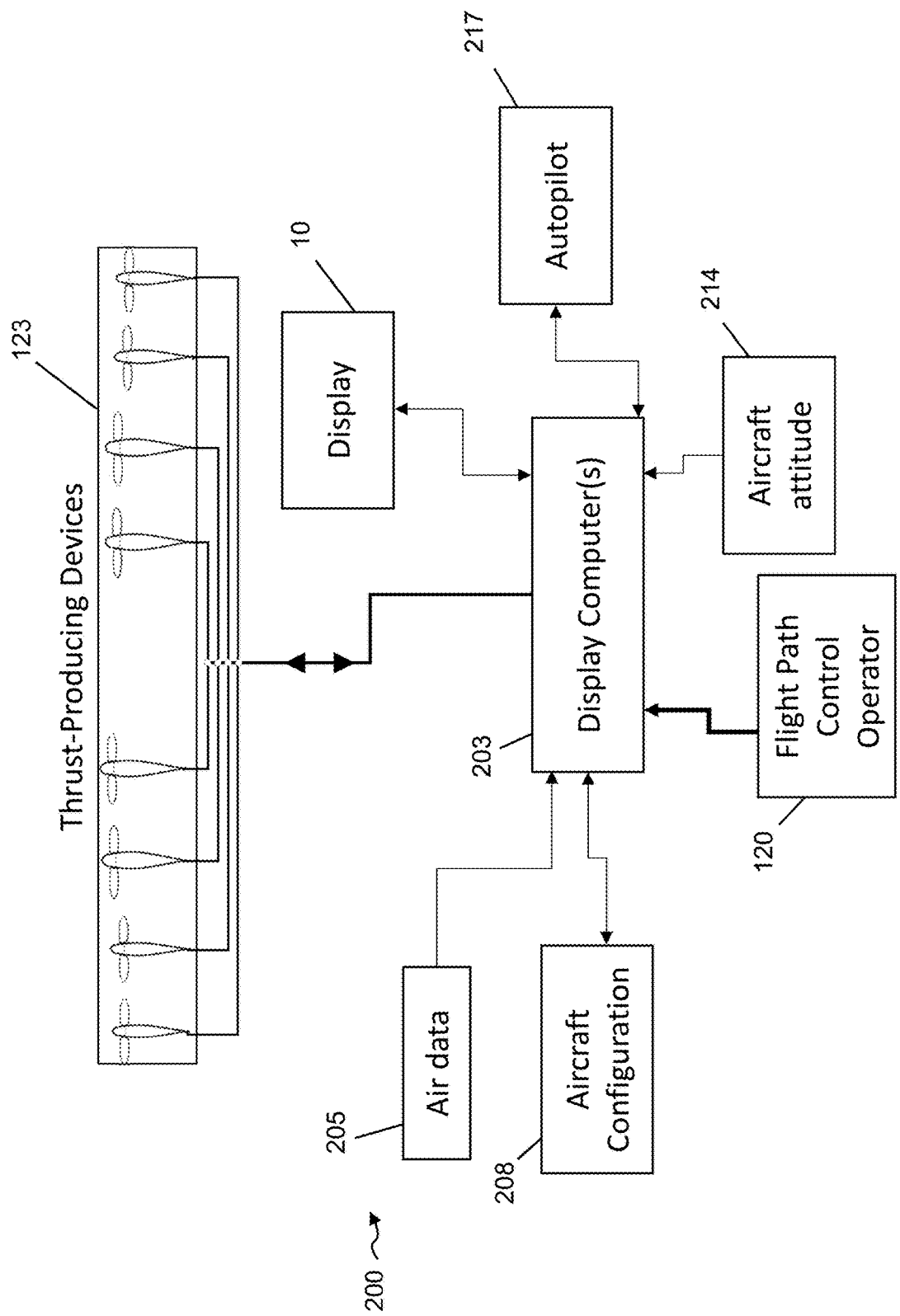
FIG. 3 illustrates a block diagram of a second example of a pilot guidance display system in accordance with some embodiments.

FIG. 3 illustrates a block diagram of a second example of a pilot guidance display system 200 in accordance with some embodiments. The pilot guidance display system 200 may include one or more display computers 203 configured to evaluate a plurality of conditions from a plurality of sensors around the aircraft and display a plurality of indications, targets, and limits on a pilot guidance display 10. The pilot guidance display system 200 may only require an input from an air data module 205, an aircraft configuration module 208, an aircraft attitude module 214, an autopilot module 217 and/or fly-by-wire system, the selected position of the flight path control operator 120, and status from the thrust-producing devices 123 to be processed by a display computer(s) 203 in order to display a pilot guidance display 10. At a minimum, the indications, targets, limits, etc. to be displayed on the pilot guidance display 10 will need an input of the aircraft speed from the air data module 205 and/or the autopilot module 217, aircraft configuration from the aircraft configuration module 208 and/or the autopilot module 217, aircraft attitude from the aircraft attitude module 214, and the power settings or conditions from the thrust-producing devices 123 and/or the autopilot module 217.

In other embodiments, the pilot guidance display system 200 may work in combination with or be replaced by a flight path control system comprising a power management computer (PMC) as disclosed in U.S. Patent Application Publication No. 2023/0205229, which was filed on Dec. 20, 2022, and is titled "SYSTEM AND METHOD FOR CONTROLLING FLIGHT PATH OF A BLOWN LIFT AIRCRAFT", the entirety of which is already incorporated herein by reference above.

The air data module 205 may be the same, similar, or different than the air data module 105 discussed above. In various embodiments, an air data module 205 is configured to be processed by the display computer 203 from a plurality of on-board sensors such as pitot and static probes, angle of attack and sideslip probes, total or static air temperature probes, radar altimeter, normal acceleration and global positioning system (GPS) data based on altitude, position, and atmospheric conditions. In various embodiments, additional data may be obtained from satellite or terrestrial transmitters. A person of ordinary skill in the art will appreciate that various sensors may be used and the above-mentioned list is not exhaustive or limiting. The sensors will provide information about the aircraft's airspeed, altitude (density and physical), and velocity vector (e.g., airspeed and/or vertical velocity). In various embodiments, the air data module 205 is operatively coupled to the aircraft configuration module 208 and, together with an input on the current aircraft weight, calculate the airspeed margin above the stall speed based on the aircraft configuration (i.e., flap deflection, aileron/flaperon deflection, etc.), which can be used to provide optimum targets for the desired mode of operation. In some embodiments, the aforementioned data is communicated to the pilot guidance display 10. For example, the output can be graphically displayed on a user interface via the display 10 to show various flight parameters (e.g., speed, altitude, pitch, flight path angle, etc.) associated with the on-board sensors as well the computed target flight path angle.

The aircraft configuration module 208 may be the same, similar, or different to the aircraft configuration module 108 as discussed above. According to some embodiments, aircraft configuration data such as flap deflection, aileron droop angles, slat extension, trim settings, landing gear extension, aircraft weight, and center of gravity will be processed by the aircraft configuration module 208 and be received via the display computer 203. Information from the aircraft configuration module 208 may be used in the overall calculation of the indications and limits of the pilot guidance display 10. In various embodiments, the flap, slat, and/or landing gear extension will determine the lift, drag, and pitching moment information of the aircraft from reference algorithms, lookup tables, and/or machine learned models. The lift information can be used to calculate the margin to the minimum safe flight speed as a function of the thrust-producing device power level. The display computer 203 may be configured to use the actual status information of the aircraft configuration (i.e., flap deflection, aileron/flaperon deflection, etc.) to calculate the limits and indications of the pilot guidance display 10 according to a calculation method such as lookup tables, referencing an algorithm, and/or utilizing a machine learned model to calculate the flight parameter indications, targets, limits, as well as margins to those limits.

In some embodiments, the pilot guidance display system 200 also includes an input from the flight path control operator 120 in order to provide the display computer 203 with the desired mode of operation. The indications and limits of the pilot guidance display 10 may change based on the selected mode of operation of the flight path control operator 120. In some embodiments, the flight path control operator 120 has at least five predefined selectable positions corresponding to takeoff/climb, cruise/taxi, descent/approach, off, reverse. To give an example, the display computer 203 may use a different algorithm, lookup table, or model to calculate some of the indications and limits of the pilot guidance display 10 based on position of the flight path control operator 120. For example, the target AOA indication (described in more detail below) or target flight path angle indicator 13 may have a different value for a takeoff/climb vs. a descent/approach mode of operation.

The attitude module 214 may be the same, similar, or different than the attitude module 114 as discussed above. In some embodiments, the attitude module 214 may be used to provide the display computer 203 with the attitude of the aircraft (e.g., roll, pitch, and yaw), which may include the bank angle. The attitude of the aircraft may be provided from a plurality of sensors such as an attitude heading reference system (AHRS), a gyro, an inertial navigation system, and/or other similar systems. The aircraft attitude module 214 may work in conjunction with various data from the air data module 205 and/or the aircraft configuration module 208, and be processed by the display computer 203 in order to ensure the aircraft is maintained within acceptable values of pitch angles. For example, the air data module 205 may provide the airspeed of an aircraft and the aircraft configuration module 208 provides the position of an elevator, the display computer 203 would then process the data and could adjust the power level of the thrust-producing devices 123 as needed to maintain an acceptable pitch angle.

The autopilot module 217 may be the same, similar, or different than the autopilot module 117 as discussed above. In various embodiments, the autopilot module 217 is configured to provide information to the display computer 203 of activation or status (i.e., if autopilot is on or off), commanded mode of operation of the autopilot module 217, speed of the aircraft, aircraft configuration, and the power setting or power condition of the thrust-producing devices 123. In other embodiments, the autopilot module 217 may utilize one or more algorithms, lookup tables, and/or machine learned model within a fly-by-wire system. Yet in other embodiments, the autopilot module 217 may be configured to receive input from the display computer 203 and optimize the commanded mode of operation as well as assist in holding airspeed, maintaining or adjusting angle of attack, and maintaining or changing flight altitude.

In various embodiments, the pilot guidance display 10 is adapted to receive input from a variety of the modules identified in FIG. 3 through the display computer 203 and is capable of displaying flight and systems information, indications, targets, and limits on a user interface of the pilot guidance display 10. The user interface of the pilot guidance display 10 may be configured to provide information in real-time, such as the plurality of conditions from the input data illustrated in FIG. 3. The pilot guidance display 10 may be configured to provide flight indications such as visual flight information, the target flight path indicator 13, the flight path limit 16, the flight path vector 19, the airspeed tape 22 (including the current airspeed indicator 49 and the allowable flap speed indicator 51), the speed bug 25, the altitude indicator 28, the attitude indicator 32, the maximum AOA indicator 35, the minimum airspeed indicator 41, the vertical speed indicator 43 and/or the pitch target 47, just to give a few examples. Although multiple flight indications are listed, it would be apparent to a person of ordinary skill in the art that other flight indications, targets, limitations, etc. may also be displayed and the aforementioned list is not exhaustive. In some embodiments, the pilot guidance display 10 may be configured to show or alert the pilot of various problems or failure scenarios.

Figure 4:
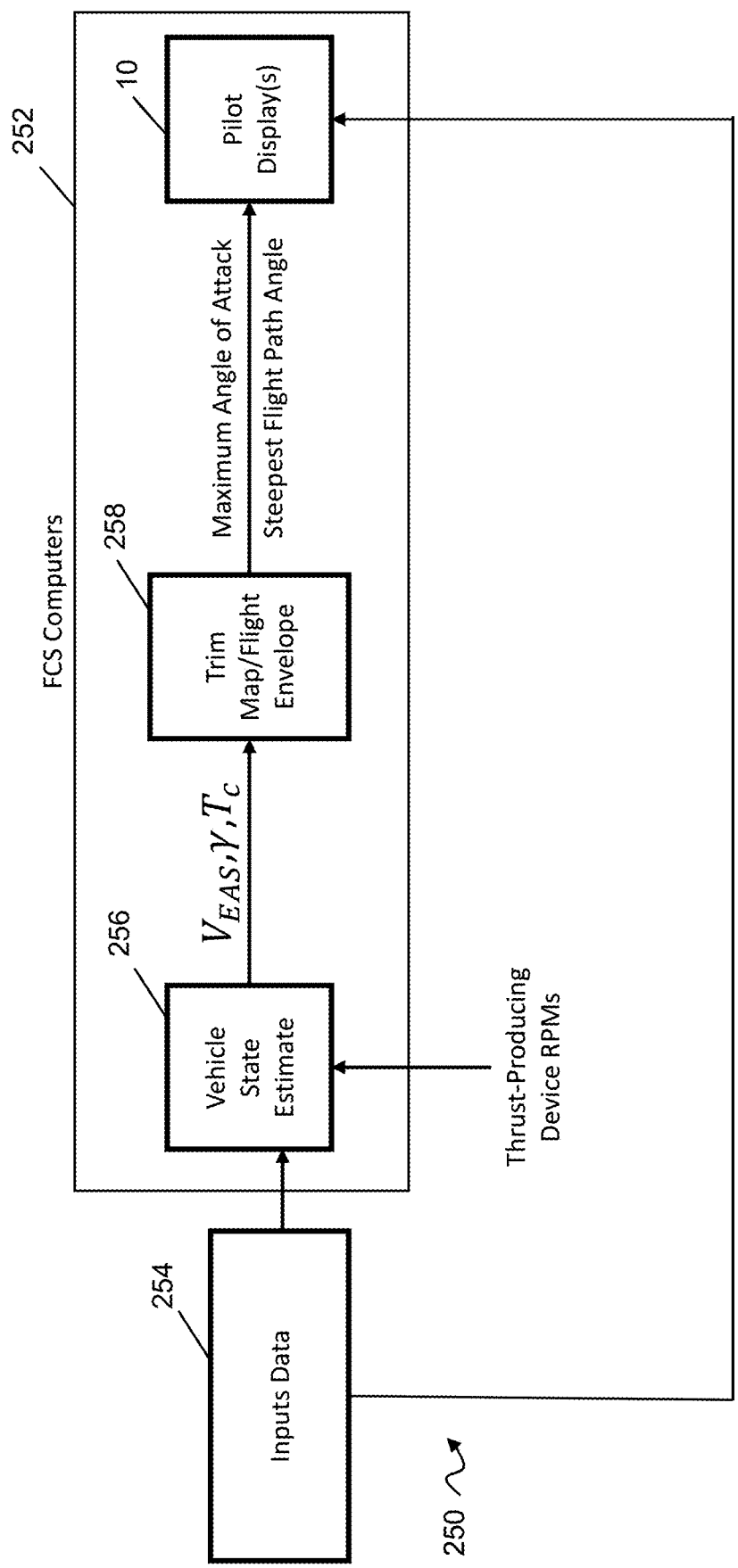
FIG. 4 illustrates a block diagram of a third example of a pilot guidance display system in accordance with some embodiments.

FIG. 4 illustrates a block diagram of a third example of a pilot guidance display system 250 in accordance with some embodiments. The pilot guidance display system 250 may include a one or more flight control system (FCS) computers 252 that is configured to take input data 254 from a plurality of sensors. The input data 254 may include airspeed, angle of attack, outside air temperature, static pressure, vertical speed, altitude, weight, configuration, approach type, and guidance information just to provide a few examples. As an example, this input data 254 may come from one or more of the sensors as discussed with reference to FIGS. 2-3. The FCS computer 252 (or controller) may process the vehicle state estimate 256 of the aircraft based on a plurality of inputs and/or sensors from the input data 254, such as airspeed, angle of attack, outside air temperature, static pressure, and vertical speed. The vehicle state estimate 256 may then calculate and/or estimate a plurality of aircraft flight information such as the equivalent airspeed of the aircraft ($V_{EAS}$), Flight Path Angle (γ), and Thrust Coefficient ($T_C$) at a minimum. This aircraft flight information may then be used to determine some of the aircraft flight limitations with a flight envelope 258, such as the example low-speed flight envelope of an eSTOL aircraft illustrated in FIG. 6 and described in more detail below, to calculate the maximum angle of attack 35, 502 and flight path limit 16. These calculated and/or estimated aircraft flight limitations may then be provided on the pilot guidance display 10 for use by the pilot.

In some embodiments, additional indications such as pitch down arrows, AOA fixed margins, etc. may be added to further aid the pilot during the different modes of operation. Additionally, in further embodiments indication of tail AOA may also be provided on the pilot guidance display 10 and/or other display devices available to the pilot. This tail AOA may define the maximum AOA 35, 502 for the overall aircraft in some embodiments.

In even further embodiments, a runway recognition system may be used to identify the runway during an approach and display go-around indications and/or audible warnings to the pilot. In some embodiments, the aircraft may fly the approach or takeoff automatically and the pilot may use the pilot guidance display system (e.g., pilot guidance display system 100, 200, 250 to monitor the aircraft state. In further embodiments, wind information from a GPS, attitude and heading reference system (AHRS), and/or a light detection and ranging (LIDAR) system may be added to the pilot guidance display 10.

In some embodiments, the indications, targets, and limits described herein could be displayed on conventional steam gauges or rotary dials. In other embodiments, the indications, targets, and limits described herein could be static targets instead of variable limits that are constantly updating as discussed above.

Figure 5:
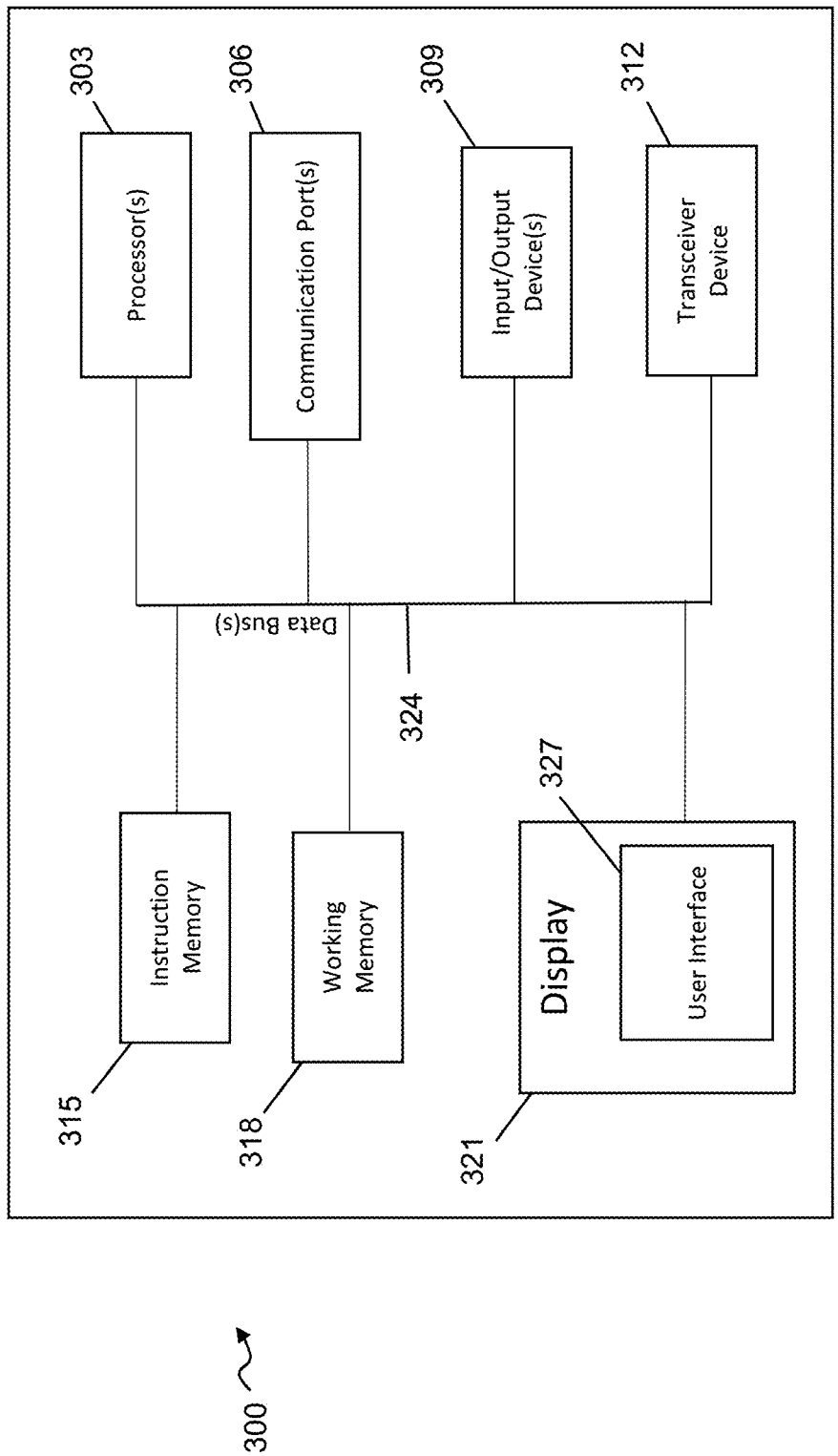
FIG. 5 illustrates a block diagram of an exemplary computing device in accordance with some embodiments.

FIG. 5 illustrates a block diagram of an exemplary computing device 300 in accordance with some embodiments. The computing device 300 can be employed by a disclosed system, such as a pilot guidance display system 100, 200 and/or 250, or used to execute a disclosed method. The computing device 300 may be utilized as a flight control system (FCS) computer 103, 252 or a display computer 203, and can implement one or more of the functions described herein. It should be understood, however, that other computing device configurations are possible.

The computing device 300 can include one or more processors 303, one or more communication port(s) 306, one or more input/output devices 309, a transceiver device 312, an instruction memory 315, a working memory 318, and a display device 321, all operatively coupled to one or more data buses 324. Data buses 324 allow for communication among the various devices (e.g., input/output devices 309, transceiver device 312, etc.), processor(s) 303, instruction memory 315, working memory 318, communication port(s) 306, and/or display device 321. Data buses 324 can include wired, or wireless, communication channels. Data buses 324 are connected to one or more devices (e.g., input/output devices 309, transceiver device 312, display device 321, etc.).

The processor(s) 303 can include one or more distinct processors, each having one or more cores. Each of the distinct processors 303 can have the same or different structures. The processor(s) 303 can include one or more central processing units (CPUs), one or more graphics processing units (GPUs), application specific integrated circuits (ASICs), digital signal processors (DSPs), and the like.

The processor(s) 303 can be configured to perform a certain function or operation by executing code, stored on instruction memory, embodying the function or operation of a pilot guidance display system 100, 200, 250 comprising the pilot guidance display 10. For example, the processor(s) 303 can be configured to perform one or more of any function, method, or operation disclosed herein.

Communication port(s) 306 can include, for example, a serial port such as a universal asynchronous receiver/transmitter (UART) connection, a Universal Serial Bus (USB) connection, or any other suitable communication port or connection. In some examples, the communication port(s) 306 allows for the programming of executable instructions in the instruction memory 315. In some examples, the communication port(s) 306 allow for the transfer, such as uploading or downloading, of data.

Input/output devices 309 can include any suitable device that allows for data input or output. For example, input/output devices 309 can include one or more of a keyboard, a touchpad, a mouse, a stylus, a touchscreen, a physical button, a speaker, a microphone, or any other suitable input or output device 309.

The transceiver device 312 can allow for communication with a network, such as a Wi-Fi network, an Ethernet network, a cellular network, or any other suitable communication network. For example, if operating in a cellular network, the transceiver device 312 may be configured to allow communications with the cellular network. The processor(s) 303 is operable to receive data from, or send data to, a network via the transceiver device 312.

The instruction memory 315 may be used to store instructions that can be accessed (e.g., read) and executed by the processor(s) 303. For example, the instruction memory 315 can be a non-transitory, computer-readable storage medium such as a read-only memory (ROM), an electrically erasable programmable read-only memory (EEPROM), flash memory, a removable disk, CD-ROM, any non-volatile memory, or any other suitable memory with instructions stored thereon. For example, the instruction memory 315 can store instructions that, when executed by one or more processors 303, cause one or more processors 303 to perform one or more of the operations of a pilot guidance display system 100, 200, 250.

In addition to the instruction memory 315, the computing device 300 can also include a working memory 318. The processor(s) 303 can store data to, and read data from, the working memory 318. For example, the processor(s) 303 can store a working set of instructions to the working memory 318, such as instructions loaded from the instruction memory 315. The processor(s) 303 can also use the working memory 318 to store dynamic data created during the operation of the computing device 300. The working memory 318 can be a random access memory (RAM) such as a static random access memory (SRAM) or dynamic random access memory (DRAM), or any other suitable memory.

The display device 321 may be configured to display a user interface 327. The user interface 327 can enable user interaction with the computing device 300. In some examples, a user can interact with the user interface 327 by engaging input/output devices 309. In some examples, the display device 321 can be a touchscreen, where the user interface 327 is displayed on the touchscreen.

Figure 6:
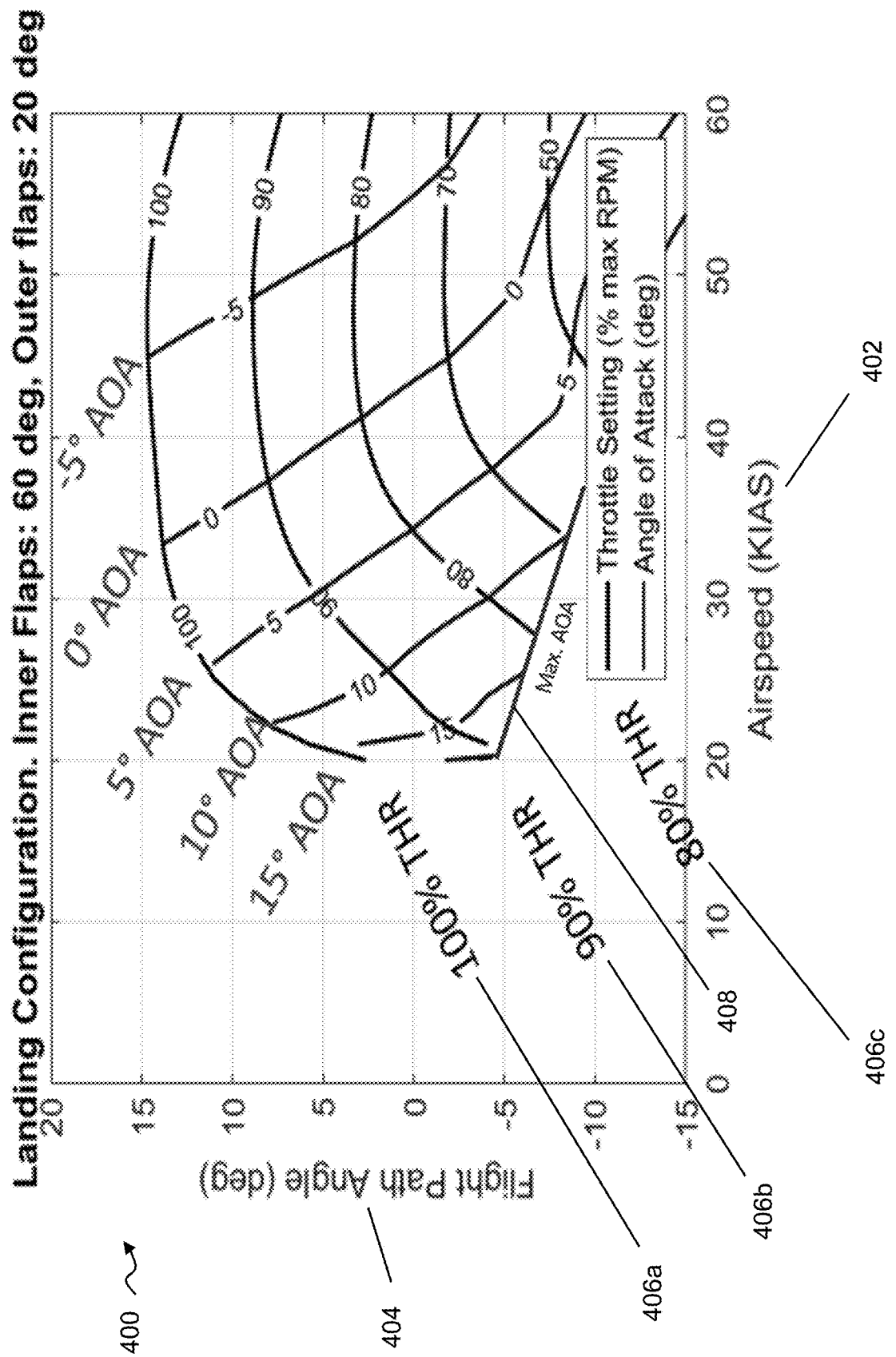
FIG. 6 illustrates an example of a low-speed flight envelope of an eSTOL aircraft in accordance with some embodiments.

FIG. 6 illustrates an example of a low-speed flight envelope 400 of an eSTOL aircraft in accordance with some embodiments. The low-speed flight envelope 400 shows the flight envelope for an eSTOL aircraft in a landing configuration with the inner flaps closest to the fuselage of the aircraft at an angle of 60 degrees with the outer flaps at an angle of 20 degrees. The low-speed flight envelope shows the various angles of attack based on the airspeed 402, flight path angle 404, and throttle setting (THR) 406a-c. As each of the airspeed 402, flight path angle 404, and/or throttle setting (or power setting) 406a-c changes, the target angle of attack will change as well. A maximum AOA indicator 35, 502 may be set to ensure the aircraft does not stall, such as the maximum AOA 408 illustrated in FIG. 6. In some embodiments, the maximum AOA 408 corresponds to the stall angle. In other embodiments, a predefined margin or buffer from the stall angle may be used to set the maximum AOA 408 to ensure the aircraft does not reach stall angle.

In order for the FCS computer 103, 252 or the display computer 203 (hereafter "computer" is either the FCS computer 103, the display computer 203, or the FCS computer 252) to display a flight path limit 16 and maximum AOA indicator 35, 502 the computer 103, 203, 252 may use lookup tables, algorithms, and/or machine learned models. The lookup tables, algorithms, and/or machine learned models will be based on the airspeed of the aircraft and the power of the thrust-producing devices 123 as well as other input data into the computer 103, 203, 252 (e.g., input data 254, air data module 105, 205, aircraft configuration module 108, 208, weight-on-wheels module 111, aircraft attitude module 114, 214, and/or autopilot module 117, 217 settings etc.). The computer 103, 203, 252 will process the aforementioned input data and display, at a minimum, the maximum AOA indicator 35, 502 and/or minimum speed indicator 41 and the flight path limit 16.

The algorithms used by the computer 103, 203, 252 to determine the maximum AOA indicator 35, minimum airspeed indicator 41, target flight path angle indicator 13, and/or flight path limit 16 will use the appropriate input data, as illustrated in FIGS. 2-4. In various embodiments, the computer 103, 203, 252 will continuously adjust the indications and limits based on any airspeed changes, power level changes, aircraft configuration changes, etc. The algorithms can include lookup tables based on aircraft performance and dynamics, closed loop feedback of input data, open loop gain, adaptive and heuristic algorithms. Some algorithms used by the computer may use best-fit equations to define a preset mapping between power, airspeed, and desired flight path angle.

As an alternative to algorithms, lookup tables may be used which contain the same input data into the computer 103, 203, 252 in tabular form and provide the pilot guidance display 10 indications, targets, and limits. The lookup tables contain the same input functions as algorithms, but the answer is found through interpolation between each of the two-dimensional tables. In other embodiments, a combination of algorithms and lookup tables, or similar open-loop methods of calculation may be used. Additional closed-loop control algorithms may be employed, and can include fixed- or scheduled-gain feedback based on airspeed, vertical speed, and/or sensed position relative to the runway.

In some embodiments, the computer 103, 203, 252 may determine some of the aircraft flight limitations with a flight envelope, such as the example low-speed flight envelope of an eSTOL aircraft illustrated in FIG. 6, to calculate the maximum angle of attack indicator 35, 502 and flight path limit 16. More sophisticated control approaches including non-linear or machine learned model-based controllers may also be employed in various embodiments. In some embodiments, the models may be a simplified form of the algorithm, where the result only approaches the desired result and the desired result is approached through further closed-loop iterations.

For example, an algorithm for the flight path limit 16 during a descent or approach mode of operation may include input functions (f) that are combined to provide the required output based on design analysis, models, or flight testing. According to some embodiments, the algorithm for flight path limit 16 is Flight Path Limit=f(weight, speed, power, flap configuration, gear configuration). The input function to the Flight Path Limit algorithm may include a multiplier or separate equation to represent the applicable input function.

In some embodiments, air data module 105, 205 measurements will be used with a prebuilt model of the power required for various flight path angle and airspeed or angle of attack combinations. In some embodiments, the power levels of the thrust producing devices 123 will be commanded based on a measurement of the aircraft position relative to the runway.

The maximum AOA indicator 35, 502 may show the maximum approved angle of attack of the aircraft for pilot to stay under. The maximum AOA indicator 35, 502 may be calculated based on the airspeed, power setting, bank angle/normal load factor, weight of the aircraft, and aircraft configuration such as flap deflection according to some embodiments. In some embodiments, the weight of the aircraft may be estimated, calculated based on known load of the aircraft, or interpolated through the use of a lookup table. The maximum AOA indicator 35, 502 calculation may also include a margin from the stall angle of attack to meet the Federal Aviation Administration (FAA) proscribed speed margin standards for safety in accordance with some embodiments. The stall angle of attack may refer to the aerodynamic stall angle of the aircraft in some embodiments. In other embodiments, the stall angle may refer to the maximum angle of attack that is allowed based on an automatic safety system such as a flight envelope protection system. Advantageously, the maximum AOA indicator 35, 502 may be continually updated by a pilot guidance display system 100, 200, 250 based on changes in aircraft parameters such as power setting, airspeed, aircraft configuration, and bank angle/load factor displaying to the pilot a real-time limit based on the changing conditions. The maximum AOA indicator 35, 502 may also act as an effective pitch limit to the pilot with knowledge of the aircraft flight path.

Figure 7:
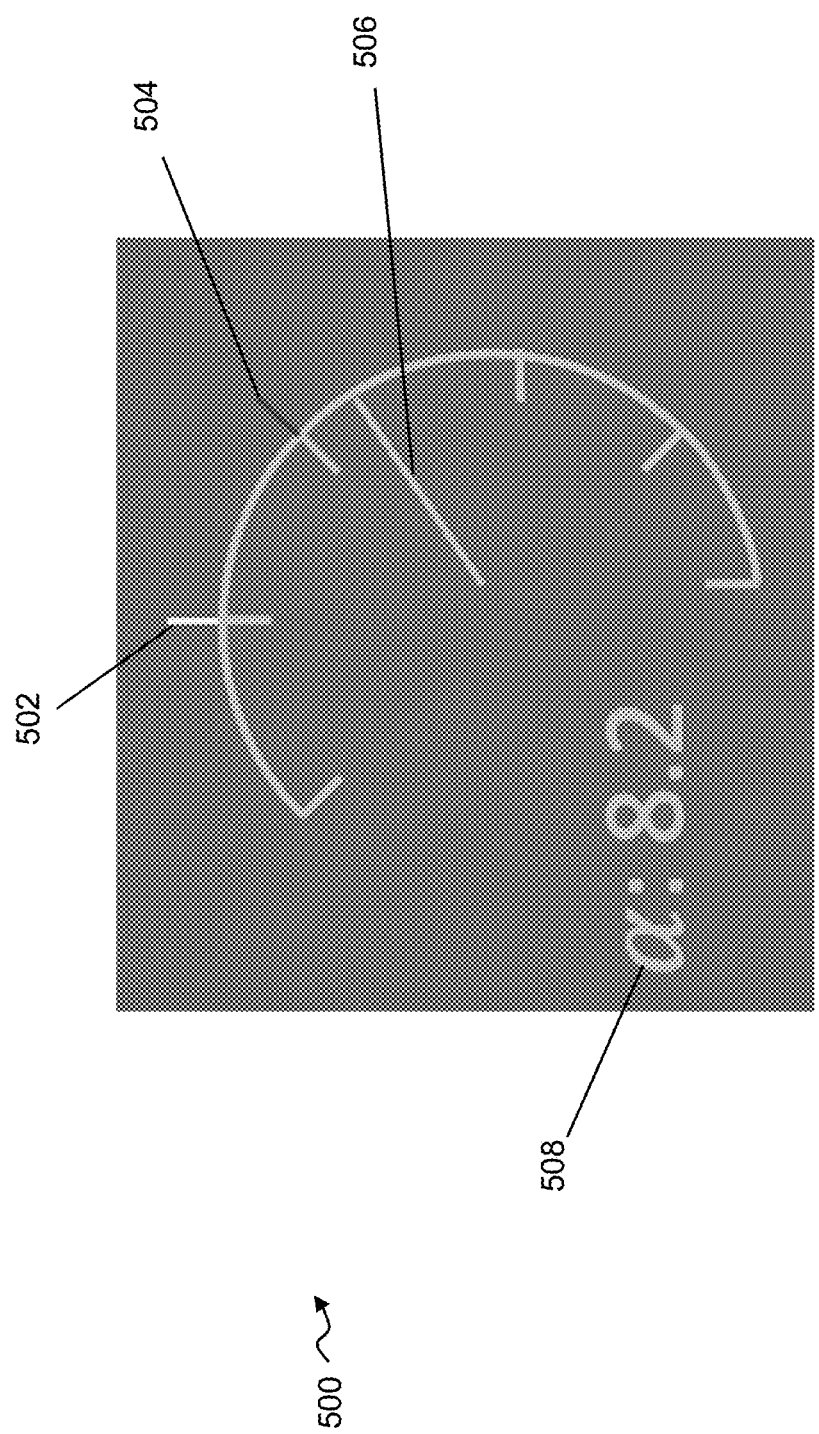
FIG. 7 illustrates an exemplary view of an angle of attack indication in accordance with some embodiments.

FIG. 7 illustrates an exemplary view of an angle of attack indication 500 in accordance with some embodiments. The angle of attack indication 500 may include a maximum AOA indicator 502, a target AOA indicator 504, and a current AOA indicator 506. In some embodiments, the angle of attack indication 500 may also include a digital numerical value of the current angle of attack, or digital AOA indicator 508. The pilot guidance display 10 may include the angle of attack indication 500 or the angle of attack indication 500 may be displayed on some other display device such as rotary indicators or a secondary HUD, HDD, angle of attack indicator, and/or primary flight display (PFD). The angle of attack indication 500 may use different colors on a generally circular indication to indicate the maximum AOA indicator 502, such as a yellow indication, and the target AOA indicator 504, such as a magenta indication.

The current AOA indicator 506 may have numerical indication (e.g., the digital AOA indicator 508) and/or a line or tick mark illustrating the current AOA 506 indicator relative to the maximum AOA indicator 502 and the target AOA indicator 504.

Figure 8:
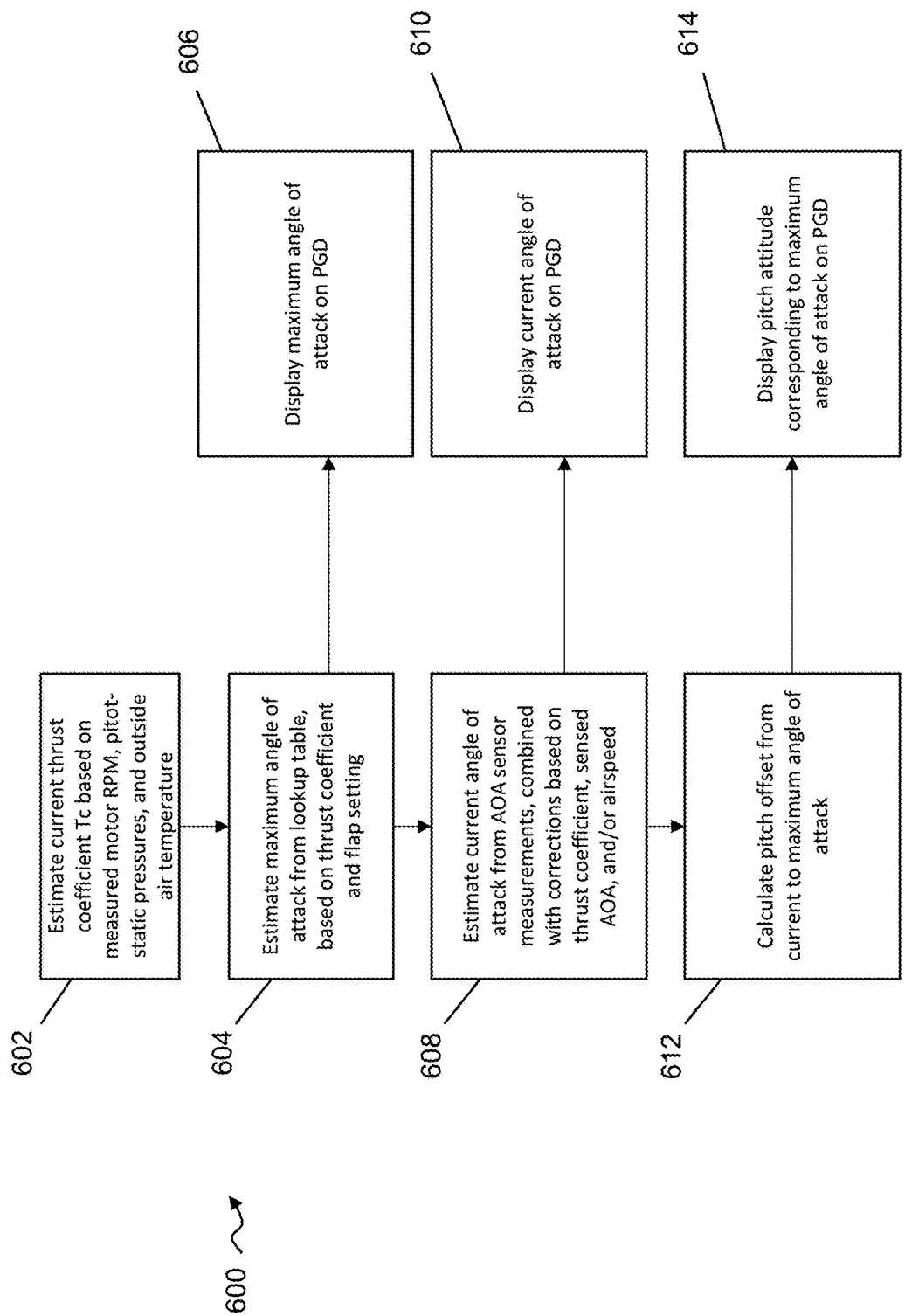
FIG. 8 illustrates an exemplary block diagram for determining angle of attack indications in accordance with some embodiments.

FIG. 8 illustrates an exemplary block diagram 700 for determining angle of attack indications in accordance with some embodiments. The pilot guidance display 10 may display the maximum AOA indicator 35, 502, current AOA indicator 506, 508, and pitch attitude corresponding to the maximum angle of attack on the pilot guidance display. In step 602, the logic for the angle of attack indications may comprise calculating/estimating the current thrust coefficient ($T_C$) based on the measured thrust-producing device 123 RPM, pitot-static pressures, and outside air temperature (OAT). In step 604, the computer 103, 203, 252 will calculate/estimate the maximum angle of attack from a lookup table based on the thrust coefficient and aircraft configuration, such as flap deflection setting. The computer 103, 203, 252 may then display the maximum AOA indicator 35, 502 on the pilot guidance display 10 in step 606. In some embodiments, the maximum AOA indicator 35 may include a chevron or bars below the indication that correspond to −1 or −2 degrees from the maximum AOA indicator 35 as a buffer. In some embodiments, an aural indication or vibration within the cockpit, such as a stick shaker, will alert the pilot that the AOA of the aircraft is within the buffer discussed above.

In step 608, the current AOA indicator 506, 508 may be calculated or estimated from an AOA sensor combined with air data corrections based on thrust coefficient, sensed AOA, and/or airspeed. In step 610, the current AOA indicator 506, 508 may be displayed on the pilot guidance display 10. In step 612, the pitch attitude corresponding to the maximum AOA may be determined by calculating the pitch offset between the current AOA and maximum AOA. In step 614, the pitch attitude corresponding to the maximum AOA may be displayed on the pilot guidance display 10. In some embodiments, the pitch attitude corresponding to the maximum AOA may be another indication similar to the pitch target indicator 47 or may be a numerical representation of the pitch attitude corresponding to the maximum AOA, similar to the digital angle of attack 508.

Figure 9A:
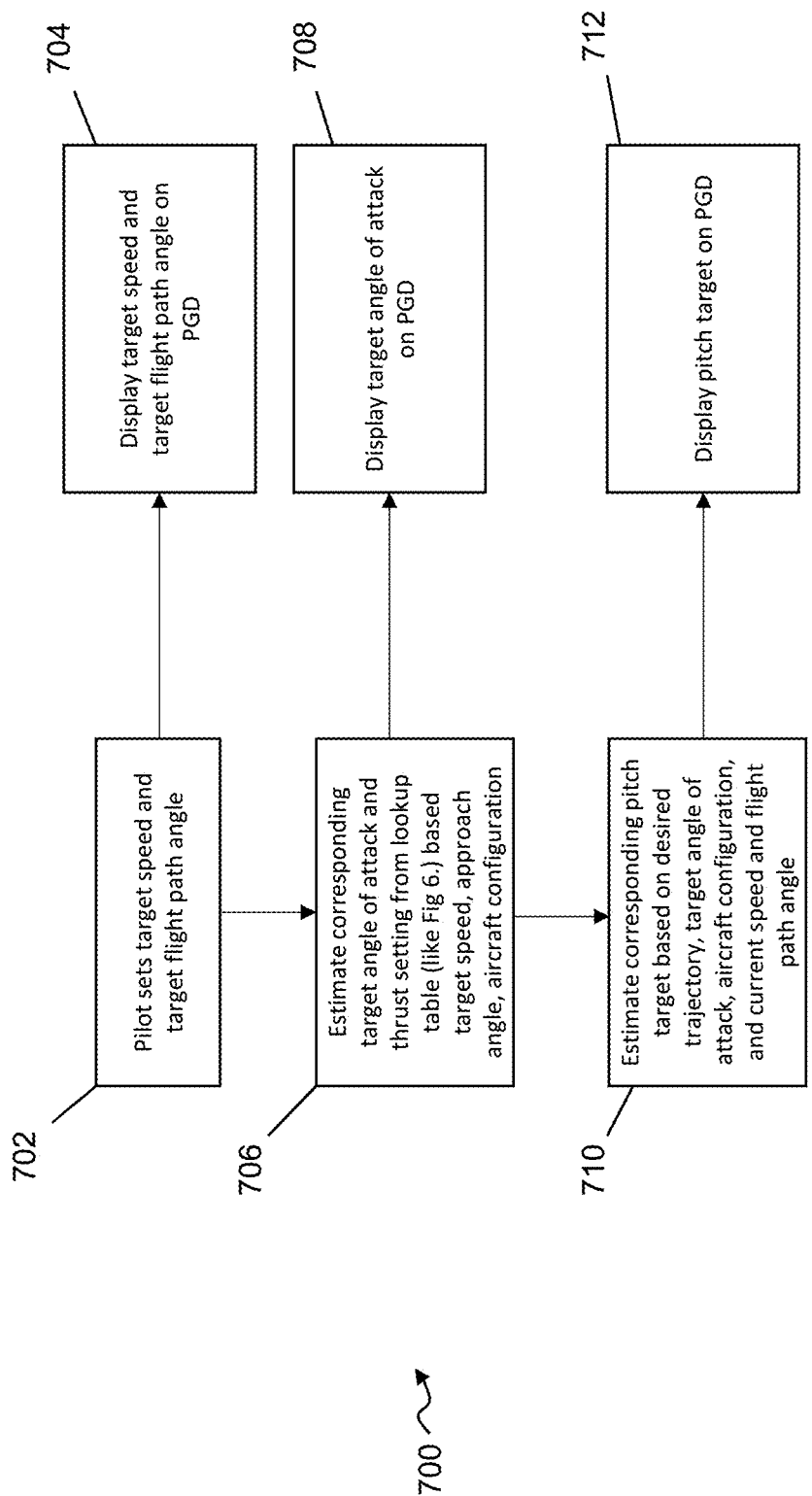
FIG. 9A illustrates an exemplary block diagram for a speed bug, a target flight path indicator, a target angle of attack indicator, and a pitch target to be set by a pilot in accordance with some embodiments.

FIG. 9A illustrates an exemplary block diagram 700 for determining the speed bug 25, the target flight path angle indicator 13, the target angle of attack indicator 504, and the pitch target 47 to be set by the pilot in accordance with some embodiments. In step 702, the pilot manually sets target speed and target approach angle, which is displayed in step 704 on the pilot guidance display as the speed bug 25 and the target flight path indicator 13. In step 706, the computer 103, 203, 252 may estimate the corresponding target angle of attack and thrust setting from a lookup table, similar to the low-speed flight envelope 400, based on target speed, approach angle, and aircraft configuration. The corresponding target angle of attack indicator 504 estimated by the computer 103, 203, 252 to then be displayed on the pilot guidance display 10 in step 708. In step 710, the pitch target 47 may then be estimated based on the desired trajectory, the target angle of attack, the aircraft configuration, the current airspeed of the aircraft, and the current flight path angle. The pitch target 47 may then be displayed on the pilot guidance display 10 in step 712.

Figure 9B:
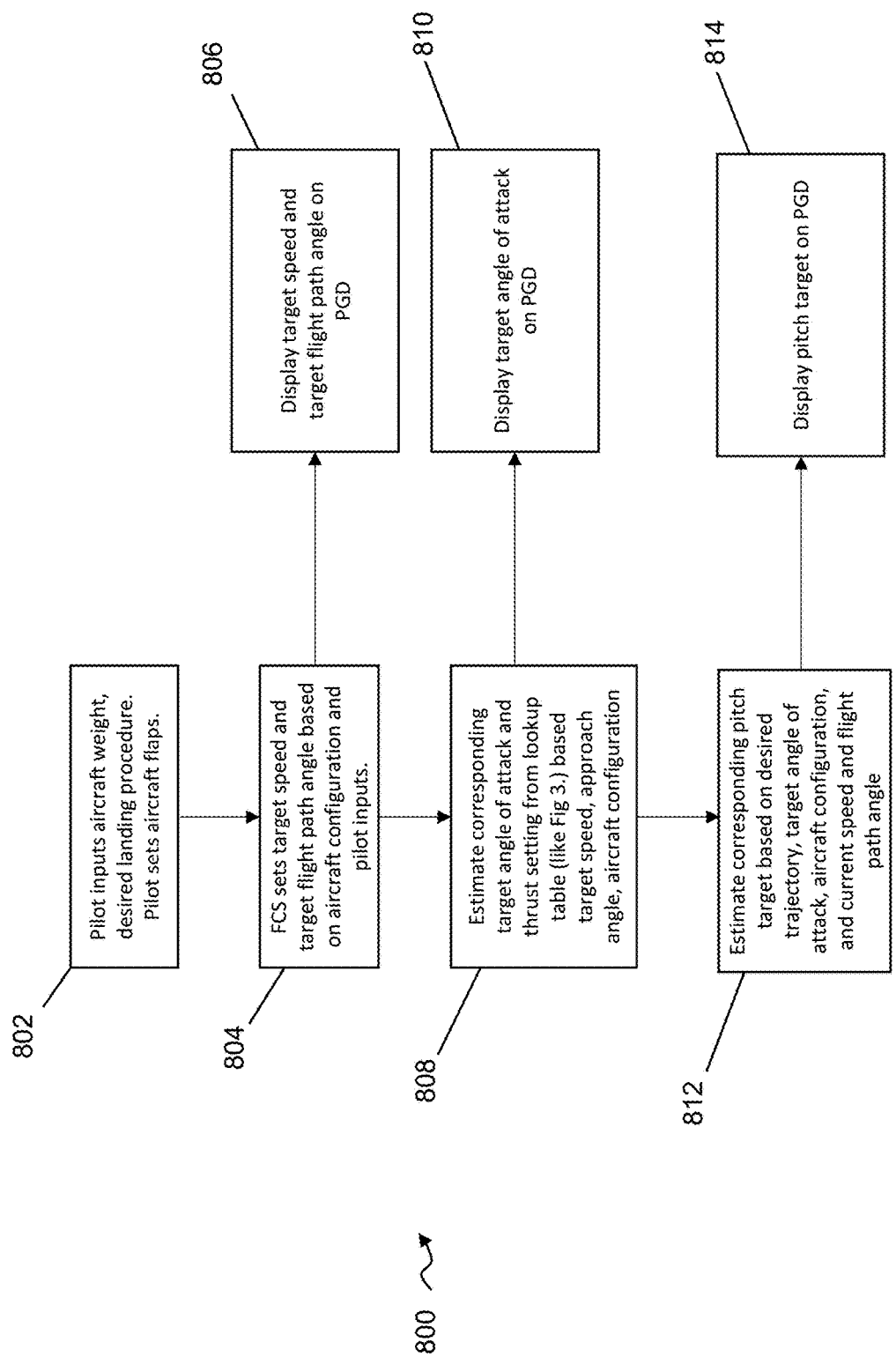
FIG. 9B illustrates an exemplary block diagram for determining a speed bug, a target flight path angle indicator, a target angle of attack, and a pitch target set by a pilot guidance display system in accordance with some embodiments.

FIG. 9B illustrates an exemplary block diagram 800 for determining the speed bug 25, the target flight path angle indicator 13, the target angle of attack indicator 504, and the pitch target 47 set by a pilot guidance display system 100, 200, 250 in accordance with some embodiments. In step 802, the pilot will input the aircraft weight, desired landing procedure, and set the configuration of the flaps. In step 804, the computer 103, 203, 252 will then set the speed bug 25 and target flight path angle indicator 13 based on the aircraft configuration and pilot input from step 802 through the use of a lookup table, which are displayed on the pilot guidance display 10 in step 806. In step 808, the computer will estimate a corresponding target AOA and thrust setting from a lookup table, similar to the low-speed flight envelope 400, based on target speed, approach angle, and aircraft configuration. The corresponding target AOA indicator 504 estimated by the computer to then be displayed as the target AOA 504 on the pilot guidance display 10 in step 810. In step 812, the pitch target 47 may then be estimated based on the desired trajectory, the target angle of attack, the aircraft configuration, the current speed of the aircraft, and the current flight path angle. The pitch target 47 may then be displayed on the pilot guidance display 10 in step 814.

Referring back to FIG. 1, a flight path vector 19, a target flight path indicator 13, and a flight path limit 16 provide a visual indication of flight path for the pilot. The flight path vector 19 may show a current flight path intercept point so the pilot can judge the route the aircraft is taking due to a variety of different factors. In some embodiments, the flight path vector 19 is calculated and/or estimated based on the indicated airspeed and vertical speed. The flight path vector indication may be an open circle, closed circle, single circular or square point, or any other variety of HUD and/or HDD symbols.

The target flight path indicator 13 may be used by the pilot during the different phases of flight to give an indication of the target flight path based on the mode of operation of the aircraft. For example, the target flight path angle indicator 13 during landing may depend on the target approach airspeed and the type of approach, which could include changes in speed, instruments used, steepness/shallowness of the approach angle, etc. This target flight path angle indicator 13 may be set manually by the pilot or automatically by the computer 103, 203, 252 based on the type of approach desired, as illustrated in FIG. 9A and FIG. 9B respectively. In some embodiments, the target flight path angle indicator 13 may include chevrons that indicate a +/−2 degrees from the actual target flight path angle.

As the aircraft reduces speed a shallower flight path angle is required for the approach, which requires real-time updates to the target flight path indicator 13 on the pilot guidance display 10. Advantageously, the target flight path indicator 13 may continuously update on the pilot guidance display 10 as the input conditions illustrated in FIGS. 2-4 change, such as airspeed and/or power setting (throttle setting). This is helpful during an approach because the aircraft may be slowing down and possibly changing power setting as it is making its approach. In some embodiments, the target flight path angle indicator 13 may use external guidance information from an instrument landing system (ILS), GPS (location and altitude information), and/or camera based aircraft state estimations to display the target flight path (glideslope) to the runway.

In various embodiments, the pilot guidance display 10 may include a flight path limit 16 that shows the steepest approach flight path angle of the aircraft. This flight path limit 16 may be based on the maximum AOA and/or the minimum allowable power, which may be based on airspeed. In some embodiments, the flight path limit 16 may be a yellow arrow showing the limit. In other embodiments the symbol for flight path limit 16 may be any other color or shape on the pilot guidance display 10. This flight path limit 16 may essentially act as a pitch limit to the pilot, which may help the pilot decide if a go-around is required during an approach. For example, if the flight path limit 16 appears to move past the touchdown aim point (or flight path vector 19) during a landing then it would indicate that the runway cannot be reached and that a go-around must be initiated to circle around and try the landing again.

In various embodiments, the pilot guidance display 10 may include a speed bug 25 and pitch target 47, to aid the pilot in visualizing and achieving the desired takeoff speed, approach speed, and target pitch/AOA angle. The speed bug 25 may be set by the pilot, and could be a magenta color or any other color to distinguish itself from other indications, targets, and limits on the pilot guidance display 10. The speed bug 25 may also show the target speed on the airspeed tape 22 for the applicable phase of flight such as takeoff or landing. The target speed from the speed bug 25 may then be translated to a target pitch/AOA angle based on a plurality of factors such as power setting, commanded flight path angle, weight, aircraft configuration such as flap setting, etc. according to some embodiments. In some embodiments the speed bug 25 may be set automatically by the computer 103, 203, 252. In other embodiments the pilot may set the speed bug 25 manually and a fly-by-wire and/or autopilot 117, 217 system maintains the target speed by automatically changing thrust-producing device 123 power settings or aircraft attitude by operating the longitudinal aerodynamic control surfaces, such as a horizontal tail, canard, and/or tandem wing.

According to some embodiments, the pitch target 47 is represented by a magenta pointer. The pitch target 47 may depend on a desired airspeed/flight path angle combination within the low-speed flight envelope 400 for various aircraft configurations. According to various embodiments, the pitch target 47 may dynamically change based on variable factors such as power setting, aircraft configuration, etc., similar to the maximum AOA indication 35, 502. In further embodiments, a fixed AOA is used to set the pitch target 47 instead of airspeed. In other embodiments, the pitch target 47 may give lateral (roll angle) guidance cues to the pilot from a variety of different sources, such as GPS estimates, predefined procedures or operations, and/or a landing guidance system such as visual runway recognition system.

Figure 10:
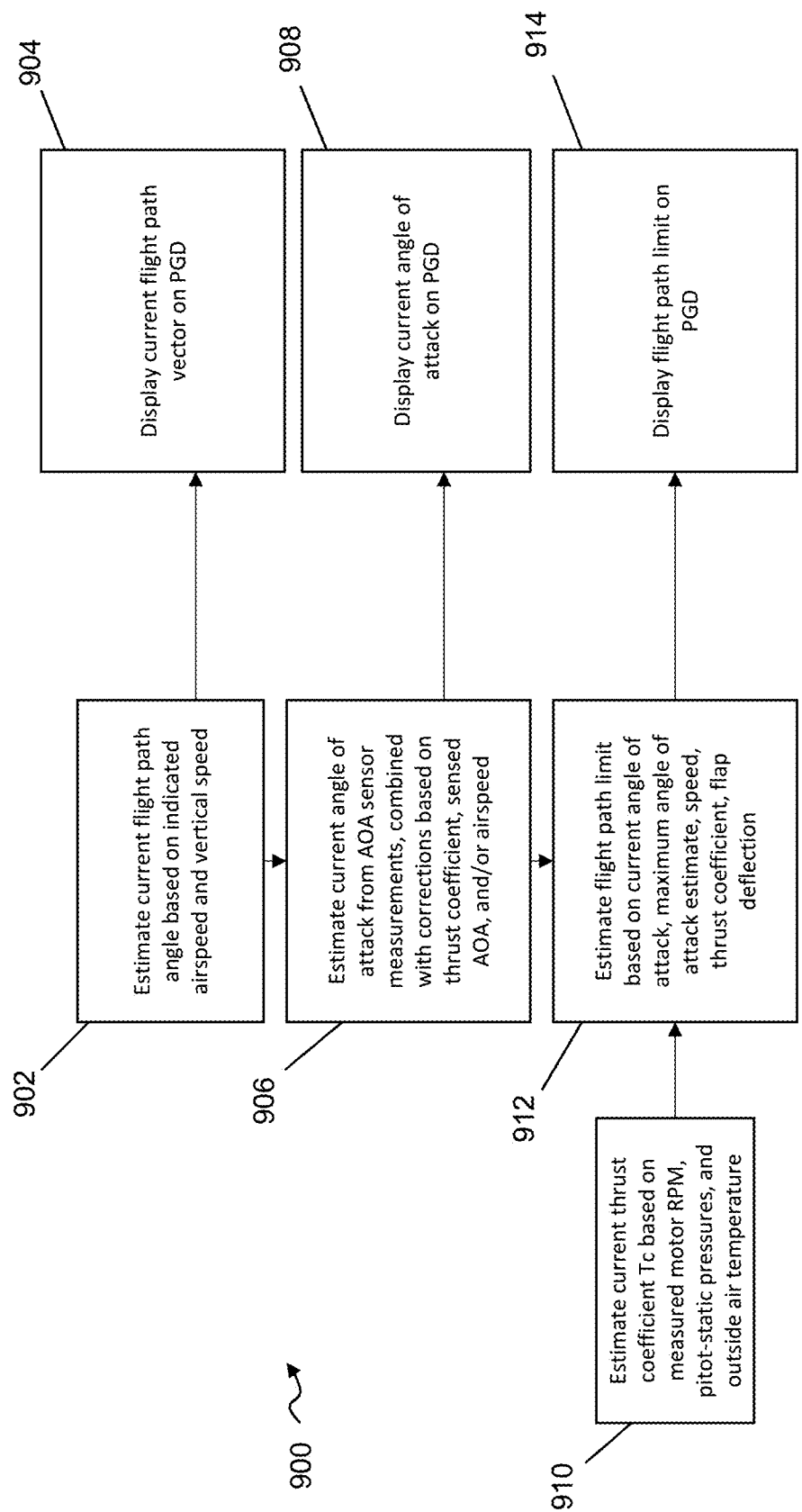
FIG. 10 illustrates an exemplary block diagram for determining flight path indications in accordance with some embodiments.

FIG. 10 illustrates an exemplary block diagram 900 for determining flight path indications in accordance with some embodiments. In step 902, the current flight vector 19 may be determined by calculating/estimating the current flight path angle based on indicated airspeed and vertical speed. In step 904, the flight path vector 19 may then be displayed on the pilot guidance display 10. In step 906, the current AOA indicator 506, 508 may be determined by calculating/estimating the current AOA from the AOA sensor combined with the air data corrections based on the thrust coefficient, sensed AOA and/or airspeed. In step 908, the current AOA indicator 506, 508 may then be displayed on the pilot guidance display 10. In step 910, the flight path limit 16 may be determined by estimating the current thrust coefficient ($T_C$) based on the thrust-producing device (e.g., electric propulsion unit (EPU)) RPM, pitot-static pressures, and outside air temperature. In step 912, the computer 103, 203, 252 may then estimate the flight path limit 16 based on the current AOA, maximum AOA estimate, speed, thrust coefficient, and aircraft configuration, such as flap deflection. In step 914, the flight path limit 16 may then be displayed on the pilot guidance display 10.

Figure 11:
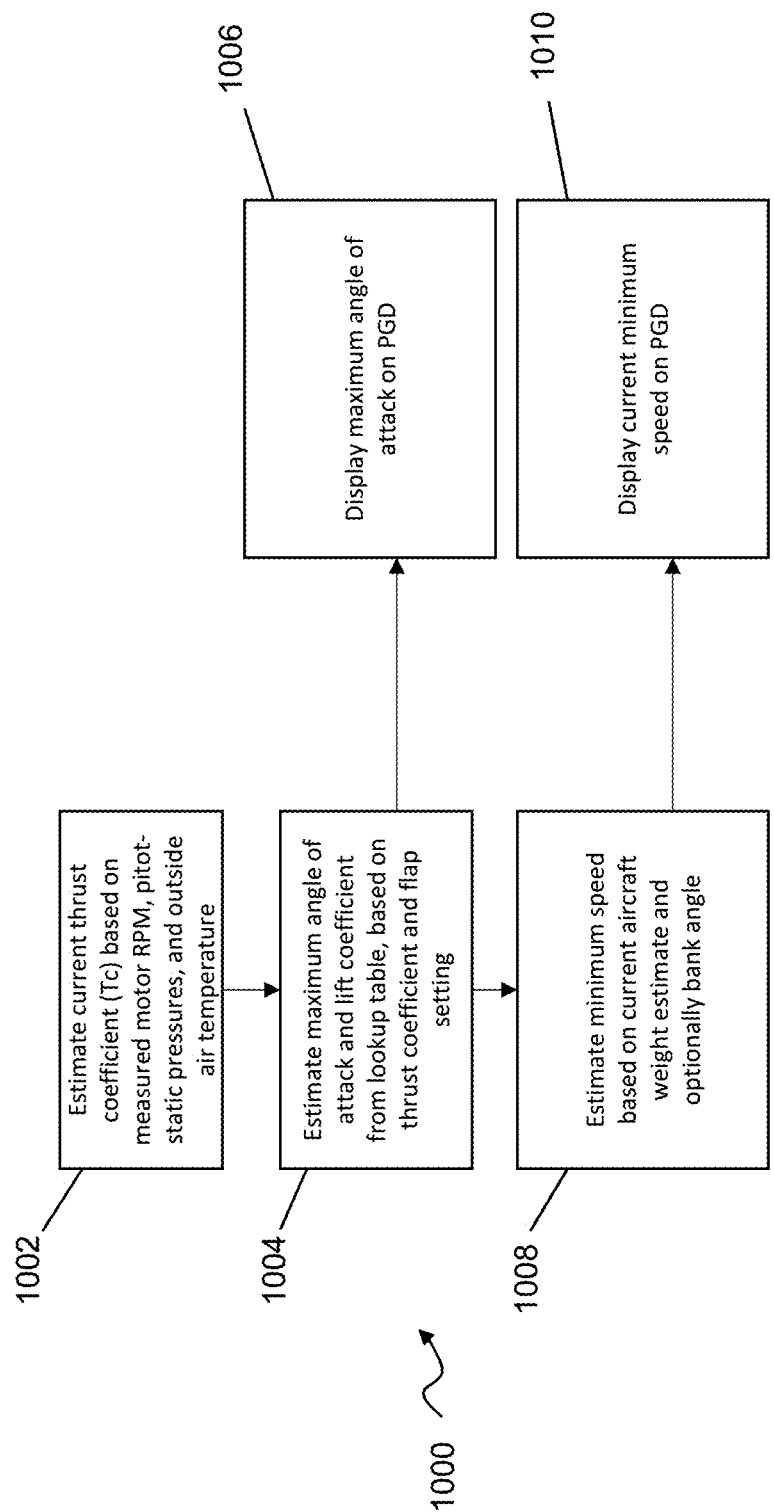
FIG. 11 illustrates an exemplary block diagram for determining a maximum angle of attack indicator and a minimum speed indicator in accordance with some embodiments.

FIG. 11 illustrates an exemplary block diagram 1000 for determining the maximum angle of attack indicator 35, 502 and the minimum speed indicator 41 in accordance with some embodiments. As shown in step 1002, the maximum AOA indicator 35, 502 and the minimum speed indicator 41 may be determined by first estimating the current thrust coefficient ($T_C$) based on measured thrust-producing device 123 RPM, pitot-static pressures, and outside air temperature. In some embodiments, the measured thrust-producing device 123 RPM may be measured directly by the computer 103, 203, 252. The pitot-static pressures and outside air temperature may be provided by the air data module 105, 205. In step 1004, the computer 103, 203, 252 may then estimate the thrust coefficient based on the information compiled in 1002. In step 1002, the computer 103, 203, 252 may estimate the maximum angle of attack and lift coefficient from a lookup table based on the thrust coefficient estimated in step 1002 and the flap setting (i.e., flap deflection angle). In response to step 1004, the computer 103, 203, 252 may display the maximum AOA indicator 35, 502 on the pilot guidance display 10 in step 1006. In step 1008, the computer 103, 203, 252 may then estimate the minimum speed based on the current aircraft weight estimate and optionally the bank angle. In step 1010, the computer 103, 203, 252 may display the current minimum speed indicator 41 on the pilot guidance display 10. In some embodiments, the aircraft weight estimate may come from the aircraft configuration module 108, 208 and the bank angle may come from the aircraft attitude module 114, 214.

Features of the Disclosure

In some embodiments, a pilot guidance display system may include a display operatively coupled to an aircraft and configured to provide a plurality of indications and a plurality of limits to a pilot. The pilot guidance display may also include a computing device operatively coupled to the aircraft and communicatively coupled to the display. The computing device may have at least one processor configured to update the plurality of indications and the plurality of limits on the display in real-time based at least in part on a plurality of conditions provided by a plurality of sensors on the aircraft. The plurality of limits may include a first maximum angle of attack indicator.

In some embodiments, the plurality of indications may include at least one of a pitch target, an airspeed tape, a current speed indicator, a speed bug, an allowable flap speed indicator, an attitude indicator, a target flight path indicator, a flight path vector, a vertical speed indicator, an altitude indicator, a target angle of attack indicator, and a current angle of attack indicator.

In some embodiments, the plurality of limits may include at least one of a minimum speed indicator and a flight path limit.

In some embodiments, the plurality of conditions may include inputs from one or more of an air data module, an aircraft configuration module, a flight path control operator, an aircraft attitude module, an autopilot module, and one or more thrust-producing devices.

In some embodiments, the plurality of conditions may include inputs from a weight-on-wheels module.

In some embodiments, the plurality of conditions may include inputs from at least one of an input data module and a vehicle state estimate.

In some embodiments, the at least one processor of the computing device may be further configured to update the plurality of indications and the plurality of limits on the display in real-time based at least in part on at least one of an algorithm, a lookup table, and a machine learned model.

In some embodiments, the display includes a touchscreen user interface.

In some embodiments, the display may include an angle of attack indication comprising a second maximum angle of attack indicator, a target angle of attack indicator, and a current angle of attack indicator.

In some embodiments, the display may be further configured to alert the pilot of at least one failure scenario.

In some embodiments, a method may include receiving, at a computing device, a plurality of conditions from a plurality of sensors on an aircraft. The method may also include evaluating the plurality of conditions from the plurality of sensors. The method may also include providing a plurality of indications and a plurality of limits on a display communicatively coupled to the computing device based at least in part on the changes in the plurality of conditions. The plurality of limits may include a first maximum angle of attack indicator.

In some embodiments, the method may include providing an angle of attack indication comprising a second maximum angle of attack indicator, a target angle of attack indicator, and a current angle of attack indicator.

In some embodiments, the plurality of indications may include at least one of a pitch target, an airspeed tape, a current speed indicator, a speed bug, an allowable flap speed indicator, an attitude indicator, a target flight path indicator, a flight path vector, a vertical speed indicator, an altitude indicator, a target angle of attack indicator, and a current angle of attack indicator.

In some embodiments, the plurality of limits may include at least one of a minimum speed indicator and a flight path limit.

In some embodiments, the evaluation may include determining the plurality of indications and the plurality of limits based at least in part on at least one of an algorithm, a lookup table, and a machine learned model.

In some embodiments, a non-transitory computer readable medium having instructions stored thereon, wherein the instructions, when executed by at least one processor may cause a computing device to perform operations including receiving a plurality of conditions from a plurality of sensors on an aircraft. The operations may also include evaluating the plurality of conditions from the plurality of sensors. The operations may also include providing a plurality of indications and a plurality of limits on a display communicatively coupled to the computing device based at least in part on the changes in the plurality of conditions. The plurality of limits may include a first maximum angle of attack indicator.

In some embodiments, the operations may include providing an angle of attack indication comprising a second maximum angle of attack indicator, a target angle of attack indicator, and a current angle of attack indicator.

In some embodiments, the plurality of indications may include at least one of a pitch target, an airspeed tape, a current speed indicator, a speed bug, an allowable flap speed indicator, an attitude indicator, a target flight path indicator, a flight path vector, a vertical speed indicator, an altitude indicator, a target angle of attack indicator, and a current angle of attack indicator.

In some embodiments, the plurality of limits may include at least one of a minimum speed indicator and a flight path limit.

In some embodiments, the evaluation may include determining the plurality of indications and the plurality of limits based at least in part on at least one of an algorithm, a lookup table, and a machine learned model.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLU- ETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term machine learned model, as used herein, includes data models created using machine learning. Machine learning, according to the present disclosure, may involve putting a model through supervised or unsupervised training. Machine learning can include models that may be trained to learn relationships between various groups of data. Machine learned models may be based on a set of algorithms that are designed to model abstractions in data by using a number of processing layers. The processing layers may be made up of levels of trainable filters, transformations, projections, hashing, pooling, and regularization. The models may be used in large-scale relationships-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

While this specification contains many specifics, these should not be construed as limitations on the scope of any disclosures, but rather as descriptions of features that may be specific to a particular embodiment. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A pilot guidance display system comprising:
a display operatively coupled to an aircraft and configured to provide a plurality of indications and a plurality of limits to a pilot; and
a computing device operatively coupled to the aircraft and communicatively coupled to the display, the computing device having at least one processor configured to update the plurality of indications and the plurality of limits on the display in real-time based at least in part on a plurality of conditions provided by a plurality of sensors on the aircraft,
wherein the plurality of limits includes a first maximum angle of attack indicator, the first maximum angle of attack indicator having one or more vertical bars, each of the one or more vertical bars representing an angle over a limit.

2. The pilot guidance display system of claim 1, wherein the plurality of indications comprise at least one of a pitch target, an airspeed tape, a current speed indicator, a speed bug, an allowable flap speed indicator, an attitude indicator, a target flight path indicator, a flight path vector, a vertical speed indicator, an altitude indicator, a target angle of attack indicator, and a current angle of attack indicator.

3. The pilot guidance display system of claim 1, wherein the plurality of limits further comprises at least one of a minimum speed indicator and a flight path limit.

4. The pilot guidance display system of claim 1, wherein the plurality of conditions comprises inputs from one or more of an air data module, an aircraft configuration module, a flight path control operator, an aircraft attitude module, an autopilot module, and one or more thrust-producing devices.

5. The pilot guidance display system of claim 4, wherein the plurality of conditions further comprise inputs from a weight-on-wheels module.

6. The pilot guidance display system of claim 1, wherein the plurality of conditions comprises inputs from at least one of an input data module and a vehicle state estimate.

7. The pilot guidance display system of claim 1, wherein the at least one processor of the computing device is further configured to update the plurality of indications and the plurality of limits on the display in real-time based at least in part on at least one of an algorithm, a lookup table, and a machine learned model.

8. The pilot guidance display system of claim 1, wherein the display includes a touchscreen user interface.

9. The pilot guidance display system of claim 1, wherein the display further includes an angle of attack indication comprising a second maximum angle of attack indicator, a target angle of attack indicator, and a current angle of attack indicator.

10. The pilot guidance display system of claim 1, wherein the display is further configured to alert the pilot of at least one failure scenario.

11. A method comprising:
receiving, at a computing device, a plurality of conditions from a plurality of sensors on an aircraft;
evaluating the plurality of conditions from the plurality of sensors; and
providing a plurality of indications and a plurality of limits on a display communicatively coupled to the computing device based at least in part on the changes in the plurality of conditions,
wherein the plurality of limits includes a first maximum angle of attack indicator, the first maximum angle of attack indicator having one or more vertical bars, each of the one or more vertical bars representing an angle over a limit.

12. The method of claim 11, further comprising providing an angle of attack indication comprising a second maximum angle of attack indicator, a target angle of attack indicator, and a current angle of attack indicator.

13. The method of claim 11, wherein the plurality of indications comprise at least one of a pitch target, an airspeed tape, a current speed indicator, a speed bug, an allowable flap speed indicator, an attitude indicator, a target flight path indicator, a flight path vector, a vertical speed indicator, an altitude indicator, a target angle of attack indicator, and a current angle of attack indicator.

14. The method of claim 11, wherein the plurality of limits further comprises at least one of a minimum speed indicator and a flight path limit.

15. The method of claim 11, wherein the evaluation further includes determining the plurality of indications and the plurality of limits based at least in part on at least one of an algorithm, a lookup table, and a machine learned model.

16. A non-transitory computer readable medium having instructions stored thereon, wherein the instructions, when executed by at least one processor cause a computing device to perform operations comprising:
receiving a plurality of conditions from a plurality of sensors on an aircraft;
evaluating the plurality of conditions from the plurality of sensors; and
providing a plurality of indications and a plurality of limits on a display communicatively coupled to the computing device based at least in part on the changes in the plurality of conditions,
wherein the plurality of limits includes a first maximum angle of attack indicator, the first maximum angle of attack indicator having one or more vertical bars, each of the one or more vertical bars representing an angle over a limit.

17. The non-transitory computer readable medium of claim 16, further comprising providing an angle of attack indication comprising a second maximum angle of attack indicator, a target angle of attack indicator, and a current angle of attack indicator.

18. The non-transitory computer readable medium method of claim 16, wherein the plurality of indications comprise at least one of a pitch target, an airspeed tape, a current speed indicator, a speed bug, an allowable flap speed indicator, an attitude indicator, a target flight path indicator, a flight path vector, a vertical speed indicator, an altitude indicator, a target angle of attack indicator, and a current angle of attack indicator.

19. The non-transitory computer readable medium of claim 16, wherein the plurality of limits further comprises at least one of a minimum speed indicator and a flight path limit.

20. The non-transitory computer readable medium of claim 16, wherein the evaluation further includes determining the plurality of indications and the plurality of limits based at least in part on at least one of an algorithm, a lookup table, and a machine learned model.

* * * * *